(12) United States Patent
Rollingson et al.

(10) Patent No.: US 11,688,121 B2
(45) Date of Patent: *Jun. 27, 2023

(54) GEOMETRY TO TILING ARBITER FOR TILE-BASED RENDERING SYSTEM

(71) Applicant: Imagination Technologies Limited, Kings Langley (GB)

(72) Inventors: Tim Rollingson, St. Albans (GB); Jairaj Dave, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/922,056

(22) Filed: Jul. 7, 2020

(65) Prior Publication Data
US 2020/0334889 A1 Oct. 22, 2020

Related U.S. Application Data

(63) Continuation of application No. 16/156,102, filed on Oct. 10, 2018, now Pat. No. 10,740,950.

(30) Foreign Application Priority Data

Oct. 10, 2017 (GB) ...................................... 1716592

(51) Int. Cl.
*G06T 15/00* (2011.01)
*G06T 11/40* (2006.01)
*G06T 15/10* (2011.01)

(52) U.S. Cl.
CPC ............ *G06T 15/005* (2013.01); *G06T 11/40* (2013.01); *G06T 15/10* (2013.01)

(58) Field of Classification Search
CPC combination set(s) only.
See application file for complete search history.

(56) References Cited

U.S. PATENT DOCUMENTS 7,633,506 B1 12/2009 Leather et al.
7,710,427 B1 * 5/2010 Hutchins ................ G09G 5/363
345/561

(Continued)

FOREIGN PATENT DOCUMENTS

CN 101620527 A 1/2010
CN 1983164 B 9/2012

(Continued)

*Primary Examiner* — Sing-Wai Wu
*Assistant Examiner* — Khoa Vu
(74) *Attorney, Agent, or Firm* — Potomac Law Group, PLLC; Vincent M DeLuca

(57) ABSTRACT

Systems and method to implement a geometry processing phase of tile-based rendering. The systems include a plurality of parallel geometry pipelines, a plurality of tiling pipelines and a geometry to tiling arbiter situated between the plurality of geometry pipelines and the plurality of tiling pipelines. Each geometry pipeline is configured to generate one or more geometry blocks for each geometry group of a subset of ordered geometry groups; generate a corresponding primitive position block for each geometry block, and compress each geometry blocks to generate a corresponding compressed geometry block. The tiling pipelines are configured to generate, from the primitive position blocks, a list for each tile indicating primitives that fall within the bounds of that tile. The geometry to tiling arbiter is configured to forward the primitive position blocks generated by the plurality of geometry pipelines to the plurality of tiling pipelines in the correct order based on the order of the geometry groups.

20 Claims, 12 Drawing Sheets

(56) References Cited

U.S. PATENT DOCUMENTS

| | | | |
|---|---|---|---|
| 2008/0150951 A1 | 6/2008 | Tuomi | |
| 2009/0303245 A1* | 12/2009 | Soupikov | G06T 15/005 345/582 |
| 2010/0110084 A1* | 5/2010 | Leather | G06T 11/40 345/506 |
| 2011/0304608 A1 | 12/2011 | Yang | |
| 2014/0071122 A1 | 3/2014 | Howson | |
| 2014/0354666 A1 | 12/2014 | Yang | |
| 2016/0371873 A1* | 12/2016 | Mantor | G06T 15/04 |
| 2017/0053375 A1 | 2/2017 | Bolz | |
| 2018/0144538 A1* | 5/2018 | Jeong | G06T 11/40 |
| 2018/0286112 A1* | 10/2018 | Lauritzen | G06T 15/06 |
| 2018/0308257 A1* | 10/2018 | Boyce | G06T 1/60 |
| 2018/0357809 A1 | 12/2018 | Lawless et al. | |

FOREIGN PATENT DOCUMENTS

| | | |
|---|---|---|
| CN | 106504184 A | 3/2017 |
| CN | 106648545 A | 5/2017 |
| EP | 2521089 A1 | 11/2012 |
| EP | 2380139 B1 | 11/2017 |
| GB | 2457525 A | 8/2009 |
| GB | 2507838 A | 5/2014 |
| WO | 02069370 A2 | 9/2002 |

\* cited by examiner

| | | | | | | | | |
|---|---|---|---|---|---|---|---|---|
| ORIGINAL GEOMETRY DATA | V0 V1 V2 | ... | | | | | | V127 — 202 |
| GEOMETRY GROUPS | V0 ... V31 GROUP 0 — 204 | V32 ... V63 GROUP 1 — 204 | | V64 ... V95 GROUP 2 — 204 | V96 ... V127 GROUP 3 — 204 | | |
| GEOMETRY BLOCKS | VD + PD — 206 | VD + PD — 206 | VD + PD — 206 | VD + PD — 206 | VD + PD — 206 | VD + PD — 206 | VD + PD — 206 |
| | BLOCK 0 — 208 | BLOCK 1 — 208 | BLOCK 0 — 208 | BLOCK 1 — 208 | BLOCK 0 — 208 | BLK 0 — 208 | BLK 1 — 208 | BLK 2 — 208 |
| PRIMITIVE POSITION BLOCKS | PPD | PPD | PPD | PPD | PPD | PPD | PPD | PPD |
| | BLOCK 0 | BLOCK 1 | BLOCK 0 | BLOCK 1 | BLOCK 0 | BLK 0 | BLK 1 | BLK 2 |
| SEQUENCE NUMBERS | 0 | 1 | 2 | 3 | 4 | 5 | 6 | 7 |

FIG. 2

GEOMETRY TO TILING ARBITER FOR TILE-BASED RENDERING SYSTEM

CROSS-REFERENCE TO RELATED APPLICATIONS AND CLAIM OF PRIORITY

This application is a continuation under 35 U.S.C. 120 of copending application Ser. No. 16/156,102 filed Oct. 10, 2018, which claims foreign priority under 35 U.S.C. 119 from United Kingdom Application No. 1716592.9 filed Oct. 10, 2017.

BACKGROUND OF THE INVENTION

As is known to those of skill in the art, tile-based rendering (TBR) in a 3D graphics processing system renders a scene using a rendering space which is divided into subsections, which are referred to as tiles, wherein each tile is rendered independently. An advantage of TBR is that fast, on-chip memory can be used during the rendering for colour, depth and stencil buffer operations, which allows a significant reduction in system memory bandwidth over traditional immediate mode rendering (IMR) wherein the entire scene is rendered as a whole.

TBR involves two key rendering phases: geometry processing; and rasterization. During the geometry processing phase the geometry data (e.g. vertices) received from an application (e.g. a game application) is transformed into screen space coordinates. Primitives (i.e. simple geometric shapes, such as triangles, defined by the positions of one or more vertices to which a texture can be applied) are defined by the transformed vertices, and the primitive data (e.g. vertex data) is stored in memory (e.g. an intermediate buffer). A per-tile list is created of the primitives (e.g. triangles) that fall at least partially within the bounds of the tile. During the rasterization phase each tile is rendered (i.e. the colour is identified for each pixel in the tile). This enables the graphics hardware to only retrieve the primitive data related to a particular tile when rendering that tile in the rasterization phase, which keeps memory bandwidth requirements for the memory (e.g. intermediate buffer) to a minimum. The resultant colour buffer for each tile may be flushed out to a buffer until the entire scene has been rendered.

It has been shown that TBR performance can be improved by parallelizing one or more aspects of the geometry processing phase.

The embodiments described below are provided by way of example only and are not limiting of implementations which solve any or all of the disadvantages of known TBR systems.

SUMMARY OF THE INVENTION

This summary is provided to introduce a selection of concepts that are further described below in the detailed description. This summary is not intended to identify key features or essential features of the claimed subject matter, nor is it intended to be used to limit the scope of the claimed subject matter.

Described herein are systems and methods to implement a geometry processing phase of tile-based rendering. The systems include a plurality of parallel geometry pipelines, a plurality of tiling pipelines and a geometry to tiling arbiter situated between the plurality of geometry pipelines and the plurality of tiling pipelines. Each geometry pipeline is configured to: generate one or more geometry blocks for each geometry group of a subset of ordered geometry groups; generate a primitive position block for each geometry block; and compress each geometry block to generate a corresponding compressed geometry block. The tiling pipelines are configured to generate, from the primitive position blocks, a list for each tile indicating primitives that fall within the bounds of that tile. The geometry to tiling arbiter is configured to forward the primitive position blocks generated by the plurality of geometry pipelines to the plurality of tiling pipelines in the correct order based on the order of the geometry groups.

A first aspect provides a system to implement a geometry processing phase of tile-based rendering, the system comprising: a plurality of parallel geometry pipelines, each geometry pipeline configured to: receive a subset of ordered geometry groups, each geometry group comprising vertex data for one or more vertices; generate, for each received geometry group, one or more geometry blocks associated with that geometry group, each geometry block comprising transformed vertex data relating to at least a portion of the vertices in the corresponding geometry group and primitive data for one or more primitives formed from the at least a portion of the vertices; compress each geometry block to generate a corresponding compressed geometry block; and generate, for each geometry block, a corresponding primitive position block that is associated with the same geometry group as that geometry block, each primitive position block comprising position information relating to at least a portion of the primitives in the corresponding geometry block; and a geometry to tiling arbiter configured to receive the primitive position blocks generated by the plurality of geometry pipelines and forward the received primitive position blocks to a plurality of tiling pipelines in an order based on the order of the geometry groups.

A second aspect provides a method of performing a geometry processing phase of tile-based rendering, the method comprising: generating, in each of a plurality of parallel geometry pipelines, one or more geometry blocks for each geometry group of a subset of ordered geometry groups, each geometry group comprising vertex data for one or more vertices, each geometry block comprising transformed vertex data relating to at least a portion of the vertices in the corresponding geometry group and primitive data for one or more primitives formed from the at least a portion of the vertices; compressing, in each of the plurality of parallel geometry pipelines, the geometry blocks to generate corresponding compressed geometry blocks; generating, in each of the plurality of parallel geometry pipelines, a primitive position block for each geometry block that is associated with the same geometry group as that geometry block, each primitive position block comprising position information relating to at least a portion of the primitives in the corresponding geometry block; and forwarding, at a geometry to tiling arbiter, the primitive position blocks generated by the plurality of geometry pipelines to a plurality of tiling pipelines in an order based on the order of the geometry groups.

The system described herein may be embodied in hardware on an integrated circuit. There may be provided a method of manufacturing, at an integrated circuit manufacturing system, the systems described herein. There may be provided an integrated circuit definition dataset that, when processed in an integrated circuit manufacturing system, configures the system to manufacture the systems described herein. There may be provided a non-transitory computer readable storage medium having stored thereon a computer readable description of an integrated circuit that, when processed in an integrated circuit manufacturing system, causes the integrated circuit manufacturing system to manufacture the systems described herein.

There may be provided an integrated circuit manufacturing system comprising: a non-transitory computer readable storage medium having stored thereon a computer readable integrated circuit description that describes the systems described herein; a layout processing system configured to process the integrated circuit description so as to generate a circuit layout description of an integrated circuit embodying the systems described herein; and an integrated circuit generation system configured to manufacture the system described herein according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings:

FIG. 2 is a schematic diagram illustrating how geometry data is partitioned during the geometry processing phase;

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, it has been determined that the performance of a TBR system may be improved by parallelizing one or more aspects of the geometry processing phase. Specifically, it has been determined that by processing received geometry data in parallel (e.g. via parallel geometry pipelines) the speed at which a scene is rendered can be improved over implementations where the geometry data is processed serially. However, since it is important that the geometry data is tiled in the order it which it was output by the 3D application or game, arbitration is performed on the parallel geometry pipelines prior to tiling to ensure that the geometry data is tiled in the correct order.

Figure 1:
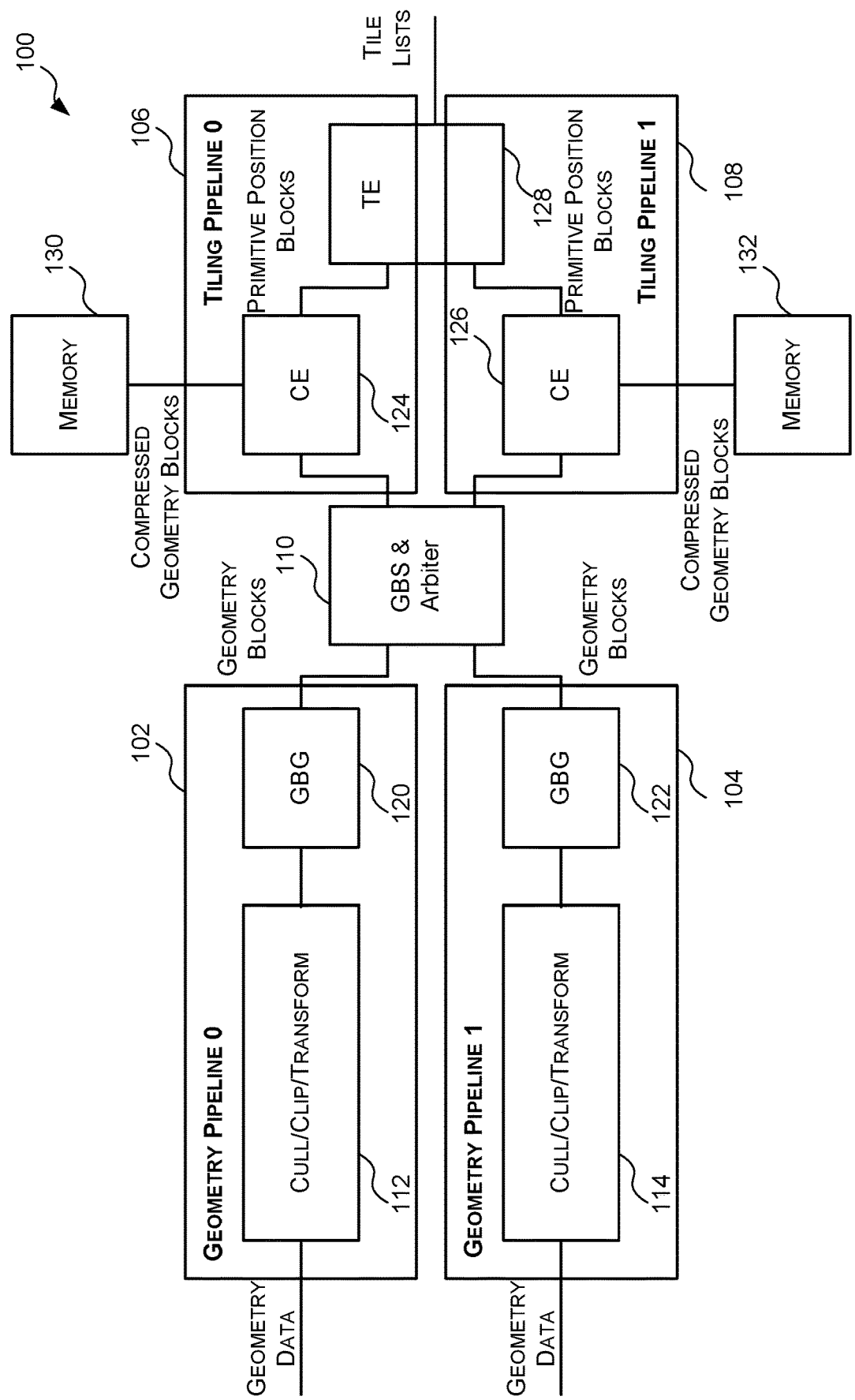
FIG. 1 is a block diagram of an example system to implement the geometry processing phase of TBR.

Reference is now made to FIG. 1 which shows an example system 100 for implementing the geometry processing phase of TBR wherein geometry data is processed in parallel by a plurality of geometry pipelines.

The system 100 comprises a plurality of geometry pipelines 102, 104 for performing geometry processing on geometry data received from a 3D application or game; a plurality of tiling pipelines 106, 108 for generating a per tile list of the processed geometry that falls within the bounds of each tile; and a geometry block storage (GBS) and arbiter unit 110 that is configured to arbitrate between the plurality of geometry pipelines 102, 104 and the plurality of tiling pipelines 106, 108 to ensure that the geometry data is tiled in the correct order.

Each geometry pipeline 102, 104 of FIG. 1 receives geometry data (e.g. information related to a plurality of vertices) generated by a 3D application or game and processes the geometry data to generate and output a plurality of geometry blocks. Each geometry block comprises vertex data related to a set of vertices and primitive data that identifies the primitives formed by the set of vertices.

The geometry data (e.g. information relating to a plurality of vertices) generated by the application or game is divided into a plurality of geometry groups (which may be referred to as primitive interleave marker (PIM) groups) so that each geometry group comprises a subset of the vertices in the original geometry data. Each geometry group is assigned a geometry group number (e.g. PIM number) indicating the order of that geometry group relative to the other geometry groups. In some cases, the geometry group number is an n-bit contiguously incrementing number where n is an integer greater than 2 (e.g. 32). A subset of the geometry groups is provided to each geometry pipeline 102, 104 for processing. The term subset is used herein to mean a set that is less than the whole. Accordingly, a subset of the geometry groups comprises less than all the geometry groups.

For example, as shown in FIG. 2, an application or game may generate original geometry data 202 (which may be referred to as a draw call) that comprises vertex data related to a plurality of vertices. In the example of FIG. 2 the original geometry data 202 comprises vertex data related to 128 vertices (V1 . . . V127), but it will be evident to a person of skill in the art that this is an example only and that the original geometry data 202 may comprise vertex data related to more or fewer vertices. If the original geometry data comprises vertex data related to a particular vertex that vertex is said to be associated with the original geometry data.

The original geometry data 202 is divided into a plurality of geometry groups 204 each of which comprises vertex data for a subset of the vertices associated with the original geometry data 202. In the example of FIG. 2 the original geometry data 202 is divided into four geometry groups 204 wherein each geometry group 204 comprises vertex data related to 32 vertices. The four geometry groups 204 are assigned geometry group numbers 0 to 3 respectively indicating that geometry group 0 comes before geometry groups 1, 2 and 3 etc. Specifically, geometry group 0 comprises vertex data related to vertices V0 to V31, geometry group 1 comprises vertex data related to vertices V32 to V63, geometry group 2 comprises vertex data related to vertices V64 to V95, and geometry group 3 comprises vertex data related to vertices V96 to V127. Although the example of FIG. 2 shows that each geometry group 204 comprises vertex data related to the same number of vertices, in other examples different geometry groups may comprise vertex data related to a different number of vertices. If a geometry group comprises vertex data related to a particular vertex that vertex is said to be associated with that geometry group.

A subset of the geometry groups 204 is provided to each geometry pipeline 102, 104 for processing. For example, geometry groups 0 and 2 of FIG. 2 may be provided to geometry pipeline 0 for processing, and geometry groups 1 and 3 of FIG. 2 may be provided to geometry pipeline 1 for processing. It will be evident to a person of skill in the art that this is an example only and the geometry groups 204 may be distributed amongst the geometry pipelines 102, 104 in any suitable manner.

For each received geometry group, the geometry pipeline 102, 104, transforms the vertex coordinates from world space to screen space, assembles primitives from the vertex data, and generates and outputs one or more geometry blocks that comprises transformed vertex data (VD) related to one or more vertices and primitive data (PD) for the primitives formed by those vertices. The vertex data may comprise, for example, for each vertex, information identifying the vertex (e.g. an index or number), the two-dimensional (x, y) co-ordinates, depth (z), and other attributes of the vertex (which may also be referred to as varyings) which are used during rendering, such as, but not limited to colour, texture etc. The primitive data 306 may comprise, for example, for each primitive, information identifying the primitive (e.g. an index or number) and information identifying the vertices which form the primitive (e.g. a list of vertex indices), or, if the primitive is a point rather than a line or polygon (e.g. triangle) the point pitch (i.e. the width of the point). Each geometry block may also comprise information which allows the geometry block to be read and/or processed such as, but not limited to, the number of vertices, primitives, and attributes in the geometry block. The geometry block also typically includes information indicating the geometry group to which it relates.

Figure 3:
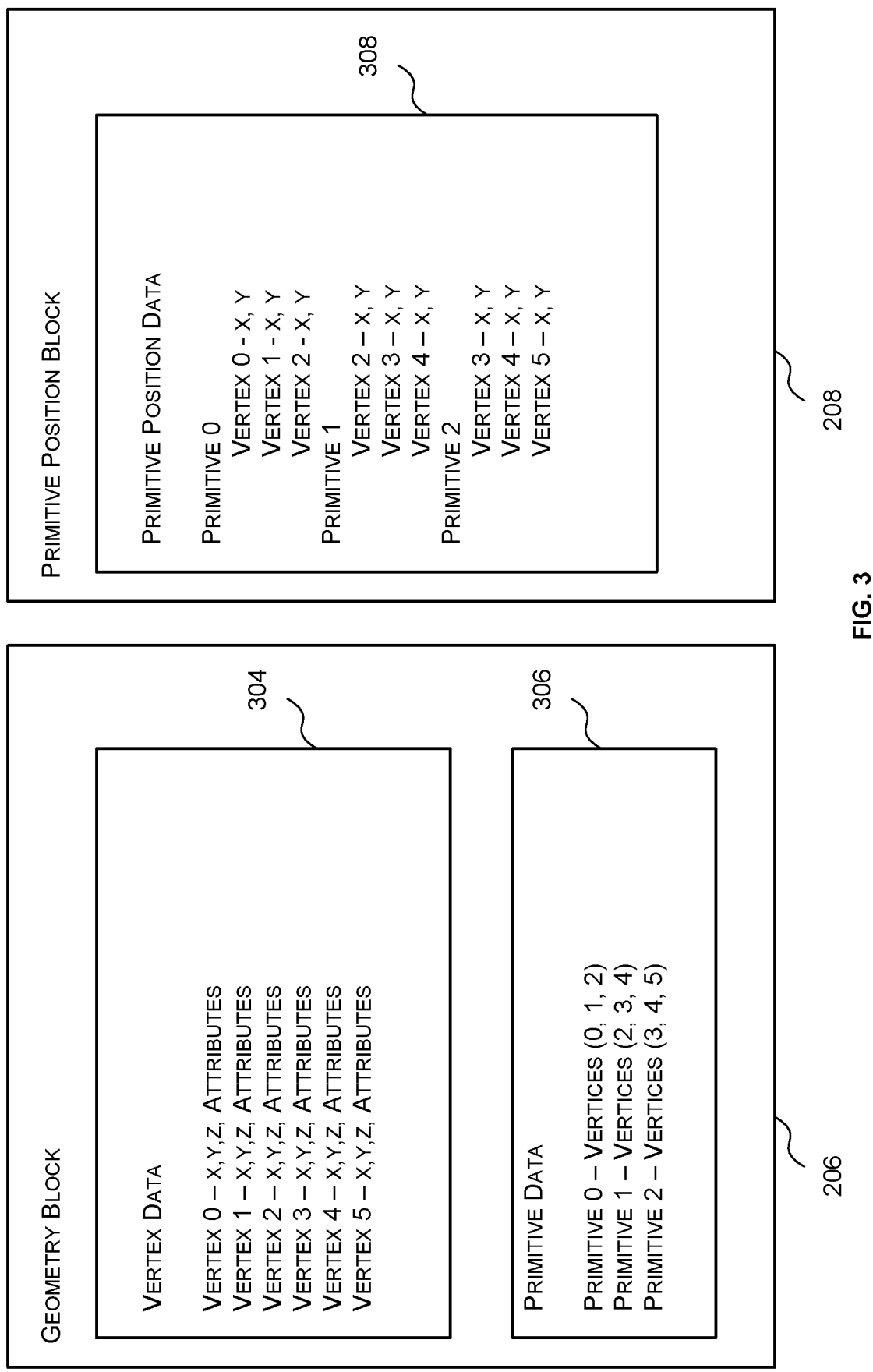
FIG. 3 is a schematic diagram of an example geometry block and an example primitive position block.

FIG. 3 illustrates an example geometry block 206 that comprises vertex data (VD) 304 and primitive data (PD) 306 related to primitives formed by those vertices. Specifically, in the example of FIG. 3 the vertex data 304 includes information for six vertices 0, 1, 2, 3, 4, 5; and the primitive data 306 includes information for three primitives 0, 1, 2—the first primitive (0) is formed by vertices 0, 1 and 2; the second primitive (1) is formed by vertices 2, 3 and 4; and the third primitive (2) is formed by vertices 3, 4 and 5.

Each geometry pipeline 102, 104 generates one or more geometry blocks for each geometry group. For example, in FIG. 2, two geometry blocks 206 are generated from geometry group 0, two geometry blocks 206 are generated from geometry group 1, one geometry block 206 is generated from geometry group 2 and three geometry blocks 206 are generated from geometry group 3. The number of geometry blocks 206 generated from a particular geometry group may be based on the maximum number of vertices that can be associated with each geometry block and the number of vertices that are associated with the geometry group when the geometry block is generated. Specifically, during geometry processing the number of vertices associated with a particular geometry group may increase (e.g. via tessellation) or decrease (e.g. via culling). Accordingly, a geometry group that was initially associated with 32 vertices may be associated with fewer than 32 vertices (e.g. 20) or more than 32 vertices (e.g. 40) when the geometry blocks are generated therefrom. Therefore, if the maximum number of vertices that can be associated with a geometry block is 32 a geometry group that is associated with 20 vertices may produce one geometry block whereas a geometry group that is associated with 40 vertices may produce two geometry blocks.

In some cases, the number of geometry blocks generated from a particular geometry group may also be based on a maximum number of primitives that can be associated with a geometry block. For example, in some cases there may be a maximum number of primitives that can be associated with a geometry block which may be less than the maximum number of primitives possible based on the maximum number of vertices that can be associated with a geometry block.

In the example of FIG. 1, each geometry pipeline 102, 104 comprises a cull/clip/transform (CCT) module 112, 114, and a Geometry Block Generator (GBG) 120, 122, however, this is only an example implementation of a geometry pipeline and it will be evident to a person skill in the art that other geometry pipelines may comprise different and/or additional components configured to generate geometry blocks from the received geometry groups. Each CCT module 112, 114 is configured to viewport transform (or camera transform) the vertices in the received geometry group from world space to screen space, assemble primitives using index data and the vertex data, perform culling to remove any unnecessary primitives and/or vertices, and clip primitives which are only partially inside the visible volume against a clipping volume (which is larger than the visible volume). Any suitable culling method may be used. For example, in some cases the vertex data may be culled to remove redundant primitives which do not contribute to the final image (which reduces the workload for the remainder of the geometry pipeline 102, 104). Specifically, since only the primitives which are within the visible volume need to be rastered, primitives which are completely outside the visible volume are discarded.

Once the vertices have been transformed, culled and clipped, and primitives have been assembled therefrom the GBG 120, 122 generates one or more geometry blocks from the transformed vertices remaining in each geometry group after the culling and clipping. As described above, each geometry block comprises transformed vertex data related to one or more vertices and primitive information related to primitives formed by those vertices. Each GBG 120, 122 essentially bundles up the transformed vertex data into chunks (geometry blocks) of an appropriate size for processing by the tiling pipelines 106, 108. As described above, the size of the geometry blocks may be determined by the number of vertices the geometry group is associated with, a maximum number of vertices per geometry block, and/or a maximum number of primitives per geometry block.

Although FIG. 1 shows a system 100 with two geometry pipelines 102, 104 it will be evident to a person of skill in the art that this is an example only and other systems may have more than two geometry pipelines.

Figure 4:
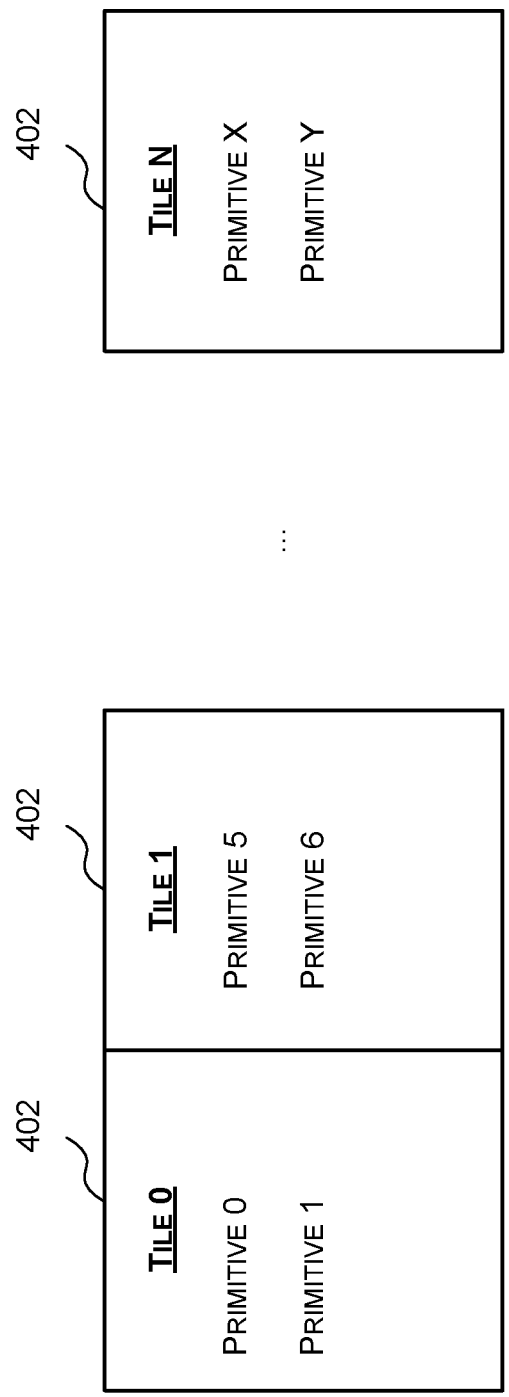
FIG. 4 is a schematic diagram of example lists output by a tiling engine.

The tiling pipelines 106, 108 receive geometry blocks generated by the geometry pipelines 102, 104, compress the received geometry blocks to generate compressed geometry blocks, generate a primitive position block for each geometry block which comprises position information related to each primitive in the geometry block, and perform tiling on the primitive position blocks to generate a list of primitives that fall within the bounds of each tile. FIG. 4 shows an example of the output 400 of the tiling pipelines 106, 108. Specifically, FIG. 4 illustrates that the output 400 of the tiling pipelines may comprise a list 402 for each of N tiles which comprises a list of the primitives that fall within the boundary of that tile. For example, the list 402 for tile 0 indicates that the primitive 0 and primitive 1 fall within the bounds of tile 0 and the list 402 for tile 1 indicates that primitives 5 and 6 falls within the bounds of tile 1. In some examples, to reduce the amount of space the lists consume the lists 402 may include pointers to the geometry blocks containing a primitive that falls within the boundaries of the tile and information (e.g. mask) for each geometry block that identifies the primitives in that geometry block that fall within the respective tile.

In the example of FIG. 1 each tiling pipeline 106, 108 comprises a compression engine (CE) 124, 126 and a portion of a tiling engine (TE) 128. Since the tiling engine (TE) does not require all the information in the geometry blocks to determine which primitives lie within each tile, but merely, the position of each primitive, the CE 124, 126 generates, for each geometry block, a corresponding primitive position block 208 which comprises information indicating the position of each primitive in the geometry block. The information indicating the primitive may include the x and y coordinates of the vertices forming the primitives, and/or the x, y coordinates of a bounding box (e.g. defined by the max and min of the x, y coordinates of the vertices forming the primitive) around each primitive. An example primitive position block 208 comprising primitive position data 308 is shown in FIG. 3 which corresponds to the example geometry block 206 shown in FIG. 3. However, so as to not lose the additional information in the geometry blocks the CE 124, 126 also compresses each geometry block to create a compressed geometry block and stores that compressed geometry block in memory 130, 132. The TE 128 then determines from the primitive position blocks 208 which tile each primitive is in and generates a list for each tile, such as the lists 402 of FIG. 4, that indicates which primitives fall within that tile.

The GBS and arbiter unit 110 arbitrates between the plurality of geometry pipelines 102, 104 and the plurality of tiling pipelines 106, 108 to ensure that the primitives are processed by the tiling pipelines 106, 108 in the correct order (i.e. the order defined by the geometry groups). Specifically, to ensure that the primitives are tiled in the correct order, the GBS and arbiter unit 110 selects the geometry pipeline 102, 104 associated with the next geometry group (e.g. PIM group) as the active geometry pipeline 102, 104 and then forwards all the geometry blocks associated with that geometry group to the tiling pipelines 106, 108 for processing. For example, where the geometry groups with lower geometry group numbers are to precede geometry groups with higher geometry group numbers the GBS and arbiter unit 110 may be configured to select the geometry pipeline 102 104 associated with the lowest geometry group number as the active geometry pipeline. Alternatively, where the geometry groups with higher geometry group numbers are to precede geometry groups with lower geometry group numbers the GBS and arbiter unit 110 may be configured to select the geometry pipeline 102, 104 associated with the highest geometry group number as the active geometry group. Once all geometry blocks associated with that geometry group (e.g. PIM group) have been processed the GBS and arbiter unit 110 selects the geometry pipeline 102, 104 associated with the next geometry group to be processed and so on.

To allow the non-selected or non-active geometry pipeline 102, 104 to continue processing geometry data (i.e. to continue outputting geometry blocks) the GBS and arbiter unit 110 comprises a small amount of memory (e.g. 40 KB per geometry pipeline) to store generated geometry blocks.

In the example system 100 of FIG. 1 the arbitration is performed prior to compression of the geometry blocks to parallelize the compression of the geometry blocks. In particular, the system 100 of FIG. 1 is designed to compress geometry blocks of the same geometry group (e.g. PIM group) in parallel. However, testing has shown that in practise the small amount of memory in the GBS and arbiter unit 110 for storing geometry blocks generated by the non-selected geometry pipeline results in the non-selected geometry pipeline often having to stall back on the upstream geometry groups. This results in the geometry pipelines 102, 104 not being able to fully run in parallel—i.e. one geometry pipeline 102, 104 is often waiting for the tiling pipelines 106, 108 to be available. Furthermore, it has been shown that it is rare that both CEs 124, 126 are in use at the same time thus the parallel compression processing does not appear to be significantly accelerating the processing of the geometry data by the tiling pipelines.

Accordingly, described herein are systems, methods and graphics processing units (GPUs) which implement the geometry processing phase of TBR using a plurality of geometry pipelines and a plurality of tiling pipelines wherein the arbitration between the geometry pipelines and the tiling pipelines is performed after compression of the geometry blocks. Specifically, in the systems, methods and GPUs described herein each geometry pipeline comprises at least one compression engine for performing compression on the geometry blocks. This extends the geometry pipeline length allowing more work to be completed by a geometry pipeline before the geometry pipeline must stall to wait for tiling pipeline resources.

Figure 5:
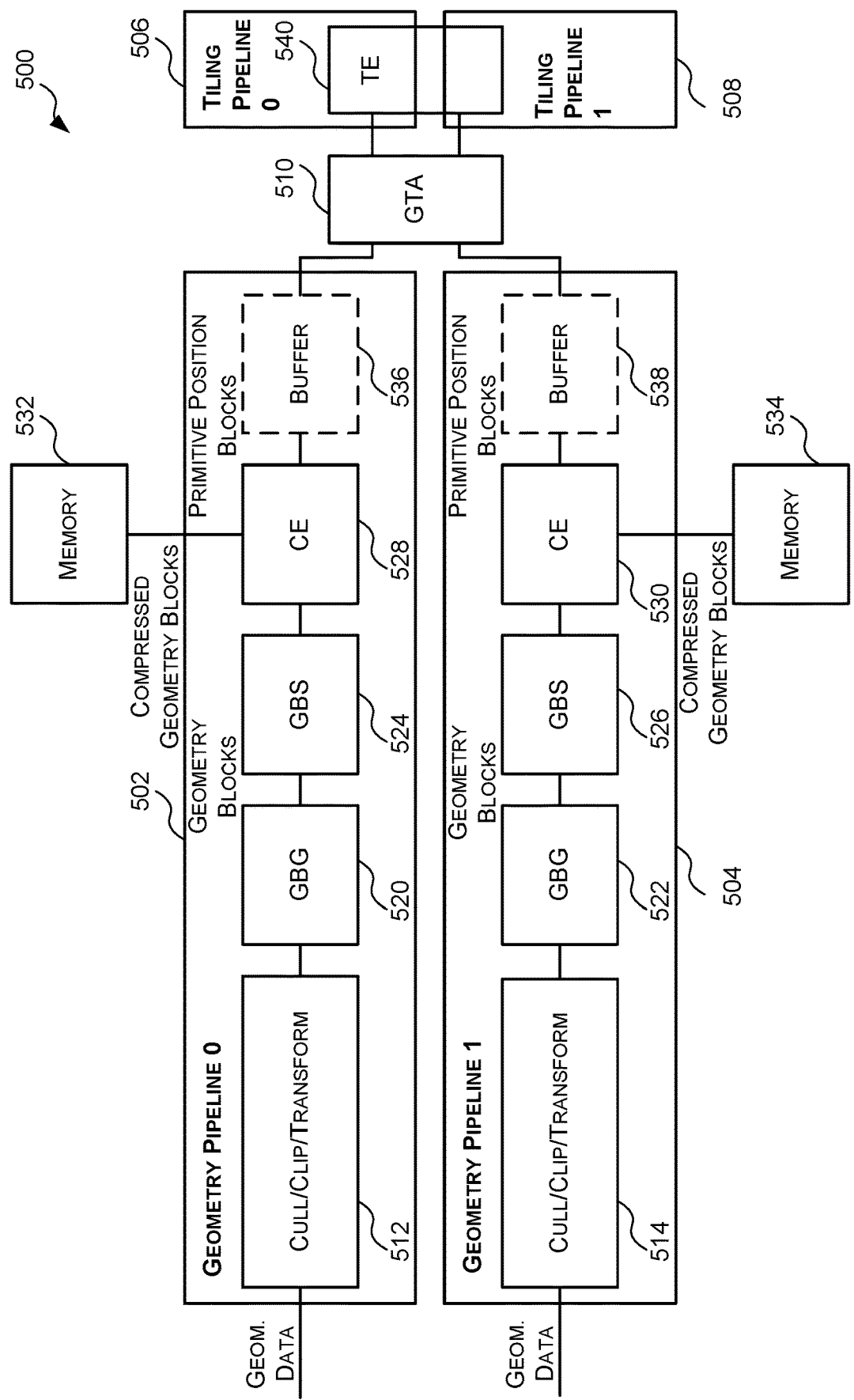
FIG. 5 is a block diagram of an example system to implement the geometry processing phase of TBR wherein compression is performed on the geometry blocks prior to geometry pipeline to tiling pipeline arbitration.

Reference is now made to FIG. 5 which illustrates an example system 500 for implementing the geometry processing phase of TBR wherein the arbitration between geometry pipelines and tiling pipelines is performed after compression of the geometry blocks. The system 500 of FIG. 5 can be used to implement the geometry processing phase of TBR, e.g. tile-based deferred rendering TBDR.

The system 500 comprises a plurality of geometry pipelines 502, 504 for generating geometry blocks from geometry data received from a 3D application or game, compressing those geometry blocks to generate corresponding compressed geometry blocks, and generating a primitive position block for each geometry block; a plurality of tiling pipelines 506, 508 for generating a per tile list of the primitives that fall within the bounds of each tile based on the primitive position blocks generated by the plurality of geometry pipelines; and a geometry to tiling arbiter 510 that is configured to arbitrate between the plurality of geometry pipelines 102, 104 and the plurality of tiling pipelines 506, 508 post compression, to ensure that the primitive position blocks are tiled in the correct order by the tiling pipelines 506, 508.

Each geometry pipeline 502, 504 receives geometry data (e.g. vertex data related to a plurality of vertices) generated by a 3D application or game, and performs geometry processing and compression on the received geometry data. As described above, the initial or original geometry data 202 generated by the application or game is divided into a plurality of geometry groups 204 and each geometry pipeline 502, 505 receives a subset of the geometry groups 204. Even though the geometry groups are sent to the geometry pipelines 502, 504 in order, since the different geometry pipelines 502, 504 receive different geometry groups and can have different stalling patterns the data output from the geometry pipelines 502, 504 may not be in the correct order. Accordingly, each geometry group (e.g. PIM group) is assigned a geometry group number (e.g. PIM number) that indicates the order of that geometry group relative to the other geometry groups. The geometry group number can be used to ensure that data (e.g. primitive position blocks) output from the geometry pipelines 502, 504 is processed in the correct order by downstream components such as the tiling pipelines.

Like the geometry pipelines 102, 104 of FIG. 1, the geometry pipelines 502, 504 of FIG. 5 generate one or more geometry blocks, such as the geometry blocks 206 described above with reference to FIG. 3, for each received geometry group. Each geometry block comprises transformed vertex data related to one or more vertices and primitive data related to primitives formed by those vertices. Each geometry block also comprises information (e.g. geometry group number/PIM number) indicating the geometry group to which it relates. However, in contrast to the geometry pipelines 102, 104 of FIG. 1 which output the generated geometry blocks to the tiling pipelines 106, 108 for processing, the geometry pipelines 502, 504 of FIG. 5 are configured to perform compression on the geometry blocks and output primitive position blocks to the tiling pipelines 506, 508.

In the example of FIG. 5 each geometry pipeline 502, 504 comprises a CCT module 512, 514; a GBG 520, 522; and a CE 528, 530. The CCT modules 512, 514, and GBGs 520, 522 of FIG. 5 correspond to the CCT modules 112, 114 and GBGs 120, 122 of the system 100 of FIG. 1 respectively and work together to generate geometry blocks, such as the geometry blocks 206 of FIG. 3, from the received geometry groups. In particular, each CCT module 512, 514 is configured to viewport transform (or camera transform) the vertices in the received geometry group from world space to screen space, assemble primitives using index data and the vertex data, perform culling to remove any redundant primitives which do not contribute to the final image (which reduces the workload for the remainder of the geometry pipeline 102, 104), and clip those primitives which are only partially inside the visible volume against a clipper volume (which is larger than the visible volume). Specifically, since only the primitives which are within the visible volume need to be rastered, primitives which are completely outside the visible volume are discarded.

Once the vertices have been transformed, culled and clipped, and primitives have been assembled therefrom the GBG 520, 522 generates one or more geometry blocks from the transformed vertices remaining in each geometry group. As described above, each geometry block comprises transformed vertex data related to one or more vertices and primitive data related to the primitives formed by those vertices. Each GBG 520, 522 essentially bundles up the transformed vertices into chunks (i.e. geometry blocks) of an appropriate size for processing by the tiling pipelines 506, 508. As described above, the number and size of the geometry blocks generated for a geometry group may be determined by the number of transformed vertices remaining in the geometry group, the maximum number of vertices per geometry block and/or a maximum number of primitives per geometry block. In some examples, the maximum number of vertices per geometry block is 64 and the maximum number of primitives per geometry block is 80, but it will be evident to a person of skill in the art that this is an example only and that other maximum numbers of vertices per geometry block and/or primitives per geometry block may be used.

The CEs 538, 530 of FIG. 5 generally perform the same functions as the CEs 124, 126 of FIG. 1. In particular, each CE 528, 530 receives geometry blocks generated by the corresponding GBG 520, 522, and generates, for each geometry block, a corresponding primitive position block which comprises information indicating the position of each primitive in the geometry block. The information indicating the position of a primitive may include the x and y coordinates of the vertices forming the primitive, and/or the x, y coordinates of a bounding box (e.g. defined by the max and min of the x, y coordinates of the vertices forming the primitive) around the primitive. Each primitive position block also comprises information (e.g. geometry group number/PIM number) indicating the geometry group to which it relates (i.e. the geometry group to which the corresponding geometry block relates).

The CEs 528, 530 also compress each geometry block to create a compressed geometry block and store the compressed geometry block in memory 130, 132. The CEs 538, 530 may perform the compression using any suitable compression technique. The compression may be performed on all or part of the geometry blocks. For example, in some cases the CEs 528, 530 may perform a 2-pass lossless compression algorithm to compress the vertex data (e.g. co-ordinates and attributes). Like the corresponding geometry blocks, in addition to comprising the data, each compressed geometry blocks typically comprises enough information about the structure of the compressed geometry block to allow a subsequent module to be able to read and/or process the compressed geometry block. For example, each compressed geometry block may comprise the number of vertices, the number of primitives, and the number of attributes. However, instead of the CEs 528, 530 forming part of the tiling pipeline as in the system 100 FIG. 1 so that the compression is performed post arbitration, the CEs 528, 530 of FIG. 5 form part of the geometry pipelines so that the compression and primitive position block generation is performed prior to arbitration.

In the example of FIG. 5 there is one CE 528, 530 per geometry pipeline 502, 504. However, in other examples there may be multiple CEs per geometry pipeline 502, 504. As described above, this lengthens the geometry pipelines 502, 504 which allows a greater level of parallel processing by the geometry pipelines 502, 504 (i.e. the geometry pipelines 502, 504 operate in parallel for a greater amount of time) which increases the performance of the system 500.

Since the GBGs 520, 522 can typically generate geometry blocks faster than the corresponding CE 528, 530 can compress the geometry blocks, each geometry pipeline 502, 504 may comprise a geometry block storage (GBS) 524, 526 for storing or buffering the geometry blocks generated by the corresponding GBG 520, 522. Where the GBG 520, 522 is configured to operate on a per geometry block basis (i.e. the GBG 520, 522 generates whole geometry blocks at the same time and cannot generate a partial geometry block) the GBS 524, 526 may be sized to be able to store the largest possible geometry block. In some cases, this results in a GBS 524, 526 with 40 KB of storage. However, most of the geometry blocks are not the largest possible size. Accordingly, in some examples the GBG 520, 522 may be configured to detect when the vertex size is large (which will result in a large geometry block) and in response to detecting that the vertex size is large, reduce the number of primitives per geometry block. The size of a vertex (e.g. whether it is a small, medium or large vertex) may be based on the number of attributes of the vertex. This allows the size of the GBS 524, 526 to be reduced to a size that more closely resembles the average geometry block size, but adds additional complexity to the GBG 520, 522.

It will be evident to a person of skill in the art that FIG. 5 illustrates an example implementation of the geometry pipelines 502, 504 of such a system and that the geometry pipelines 502, 504 may comprise additional and/or different components.

Furthermore, although the example system 500 of FIG. 5 comprises two geometry pipelines 502, 504 the principles, methods and techniques described herein may be applied to systems with more than two geometry pipelines 502, 504.

Each tiling pipeline 506, 508 receives primitive position blocks output by at least one of the geometry pipelines 502, 504, determines which tile(s) each primitive falls within, and generates and outputs a list for each tile that identifies the primitives that fall within the boundaries of that tile. For example, the tiling pipelines 506, 508 may output lists such as the lists 402 of FIG. 4. In the system 500 of FIG. 5 each tiling pipeline 506, 508 corresponds to a portion of the TE 540 defined by a particular input port of the TE 540, however this is an example only and in other examples each tiling pipeline may comprise a separate TE.

Furthermore, although the example system 500 of FIG. 5 comprises two tiling pipelines 506, 508 the principles, methods and techniques described herein may be applied to systems with more than two tiling pipelines 506, 508.

The GTA 510 arbitrates between the geometry pipelines 502, 504 and the tiling pipelines 506, 508 to ensure that the primitive position blocks are processed by the tiling pipelines in the correct order (e.g. the order in which it was originally output by the application or game). In particular, the GTA 510 is configured to select one of the geometry pipelines 502, 504 as the active pipeline based on which geometry pipeline 502, 504 is associated with the next geometry group (e.g. based on the geometry group number) and then forwards each primitive position block of that geometry group to one of the tiling pipelines 506, 508 for processing. As described above, each geometry group is assigned a geometry group number that indicates the order of that geometry group relative to the other geometry groups. If the geometry groups are numbered such that a geometry group with a lower geometry group number should precede a geometry group with a higher number then the GTA 510 may be configured to select the geometry pipeline 502, 504 associated with the lowest geometry group number as the active geometry pipeline. However, if the geometry groups are numbered such that a geometry group with a higher number should precede a geometry group with a lower number then the GTA 510 may be configured to select the geometry pipeline 502, 504 associated with the highest numbered geometry group as the active geometry pipeline.

In some cases, there may be a dedicated tiling pipeline for each geometry pipeline such that the primitive position blocks for a particular geometry pipeline must be processed by a particular tiling pipeline. In these cases, the GTA 510 may be configured to forward the primitive position blocks of the selected or active geometry pipeline to the tiling pipeline associated with the active geometry pipeline. For example, in FIG. 5 the GTA 510 may be configured to forward all primitive position blocks from geometry pipeline 0 to tiling pipeline 0 and the GTA 510 may be configured to forward all primitive position blocks from geometry pipeline 1 to tiling pipeline 1.

In other cases, however, the tiling pipelines may be configured to receive primitive position blocks from any geometry pipeline. This can greatly improve the efficiency of packing primitive position blocks from the CEs into the tiling pipelines over systems where each tiling pipeline is tied to a specific geometry pipeline. This also allows the geometry pipelines to be scaled separately from the tiling pipelines. In these cases, the GTA 510 may be configured to forward primitive position blocks to tiling pipelines in any suitable manner (e.g. in a round robin manner or a demand driven manner).

For example, in some cases, each tiling pipeline (e.g. tiling port of a tiling engine) may be associated with a circular buffer storage and the GTA 510 uses a credit scheme based on available circular buffer space to determine which pipeline to forward a received primitive position block. Specifically, when a primitive position block is forwarded to a particular tiling pipeline (e.g. tiling engine port), the size of the primitive position block is decremented from the internal credit counter for the tiling pipeline to indicate the size of storage currently in use. When the tiling pipeline completes processing of a primitive position blocks it notifies the GTA 510 by returning credits equal to the primitive position block size. The credit counters may be reset, upon reset of the system, to the full storage size. When a primitive position block is received at the GTA 510, the GTA 510 may select the tiling pipeline (e.g. port of a tiling engine) with the largest number of credits remaining (e.g. the tiling pipeline with the most amount of space in the circular buffer) to process that primitive position block. If none of the tiling pipelines have enough credits remaining the GTA 510 may stall the CEs. In these cases, the GTA 510 may also provide information to the tiling pipelines that indicates the geometry pipeline from which the primitive position block came from since this is no longer inherent.

The GTA 510 may also be configured to translate the geometry group numbers associated with the received primitive position blocks to sequence numbers to ensure that the primitive position blocks are processed in the correct order by the TE 540. Since multiple geometry blocks (and thus multiple primitive position blocks) can be associated with the same geometry group (and thus the same geometry group number), to ensure that the ordering of the individual primitive position blocks is maintained, each primitive position block is assigned a sequence number. For example, as shown in FIG. 2 if geometry group 0 produces geometry blocks 0 and 1 (resulting in primitive position blocks 0 and 1), and geometry group 1 also produces geometry blocks 0 and 1 (resulting in primitive position blocks 0 and 1), then primitive position block 0 of geometry group 0 may be assigned sequence number 0; primitive position block 1 of geometry group 0 may be assigned sequence number 1; primitive position block 0 of geometry group 1 may be assigned sequence number 2; and primitive position block 1 of geometry group 1 may be assigned sequence number 3 and so on.

An example implementation of the GTA 510 will be described below with reference to FIGS. 7 and 8.

In some examples, each geometry pipeline 502, 504 may also comprise an additional buffer 536, 538 that follows the corresponding CE 528, 530 in the geometry pipeline 502, 504 to allow the unselected geometry pipeline 502, 504 to continue to process geometry data for longer without having to stall while the selected geometry pipeline data is being processed by the tiling pipelines. Adding the additional buffer 536, 538 post compression makes the additional buffer more efficient than adding an additional buffer prior to compression. This is because a post compression buffer 536, 538 stores the primitive position blocks, which are smaller than the corresponding geometry blocks.

In some cases, the primitive position blocks generated by the CEs 528, 530 can be divided into three subsets of data—primitive position data, sideband data, and ordering or sequencing data. In these cases, the additional buffer 536, 538 may also be divided into three sub-buffers, one for each type of data in the primitive position block—e.g. a primitive buffer, a sideband buffer and an ordering/sequencing buffer. Where the maximum number of primitives per geometry group (e.g. PIM group) is max_primitives_geometry_group then for maximum performance the primitive buffer should be num_geometry_pipelines*max_primitives_geometry_group. This would mean that where the maximum number of primitives per geometry group is 256 and there are two geometry pipelines 502, 504 then for maximum performance the primitive buffer should be 512 deep (i.e. be able to hold primitive information for 512 primitives). Where the CEs 528, 530 are configured to operate on a per geometry block basis (i.e. the CEs 528 and 530 are configured to processes a whole geometry block at a time and cannot process a partial geometry block) the primitive buffer should ideally be sized to allow storage of primitive information for a whole number of geometry blocks. Where each geometry block can have a maximum of 80 primitives this would increase the optimum size of the primitive buffer to 560 (i.e. 512 rounded up to the nearest multiple of 80) deep. However, while this is the theoretical optimum size for the primitive buffer this theoretical primitive buffer depth only applies in the worst case and in typical cases geometry groups will comprise less than 256 primitives thus is likely that a primitive buffer with a depth less than even 512 will be sufficient.

Since there is only one set of sequencing data and sideband data per primitive position block 208 the sequencing and sideband buffers only need to store one set of data per primitive position block 208. Accordingly, the sequencing and sideband buffers can be sized based on the size of the primitive buffer as shown in equation (1). In particular, the depth of the sequencing and sideband buffers can be calculated as the depth of the primitive buffer divided by the average number of primitives per primitive position block. For example, if there are on average 16 primitives per primitive position block and the primitive buffer has a depth of 512 then the sequence and sideband buffers should, according to equation (1), have a depth around 32.

$$SQBuffDepth = \frac{PrimBufferDepth}{AvgPrimPerBlock} \quad (1)$$

Testing has shown that when using small to medium sized vertices a CE 528, 530 is able to process the geometry blocks generated by the corresponding GBG 520, 522 quickly enough to prevent being the bottleneck of the geometry pipeline, but when using large vertices, the CE may become the bottleneck in the geometry pipeline 502, 504. However, in both cases, systems, such as system 500 of FIG. 5, in which compression is performed prior to geometry-tiling pipeline arbitration has shown improved performance over a system, such as the system 100 of FIG. 1, where compression is performed post geometry-tiling pipeline arbitration because the geometry pipelines are able to work in parallel for longer before being stalled waiting for tiling pipeline resources.

Figure 6:
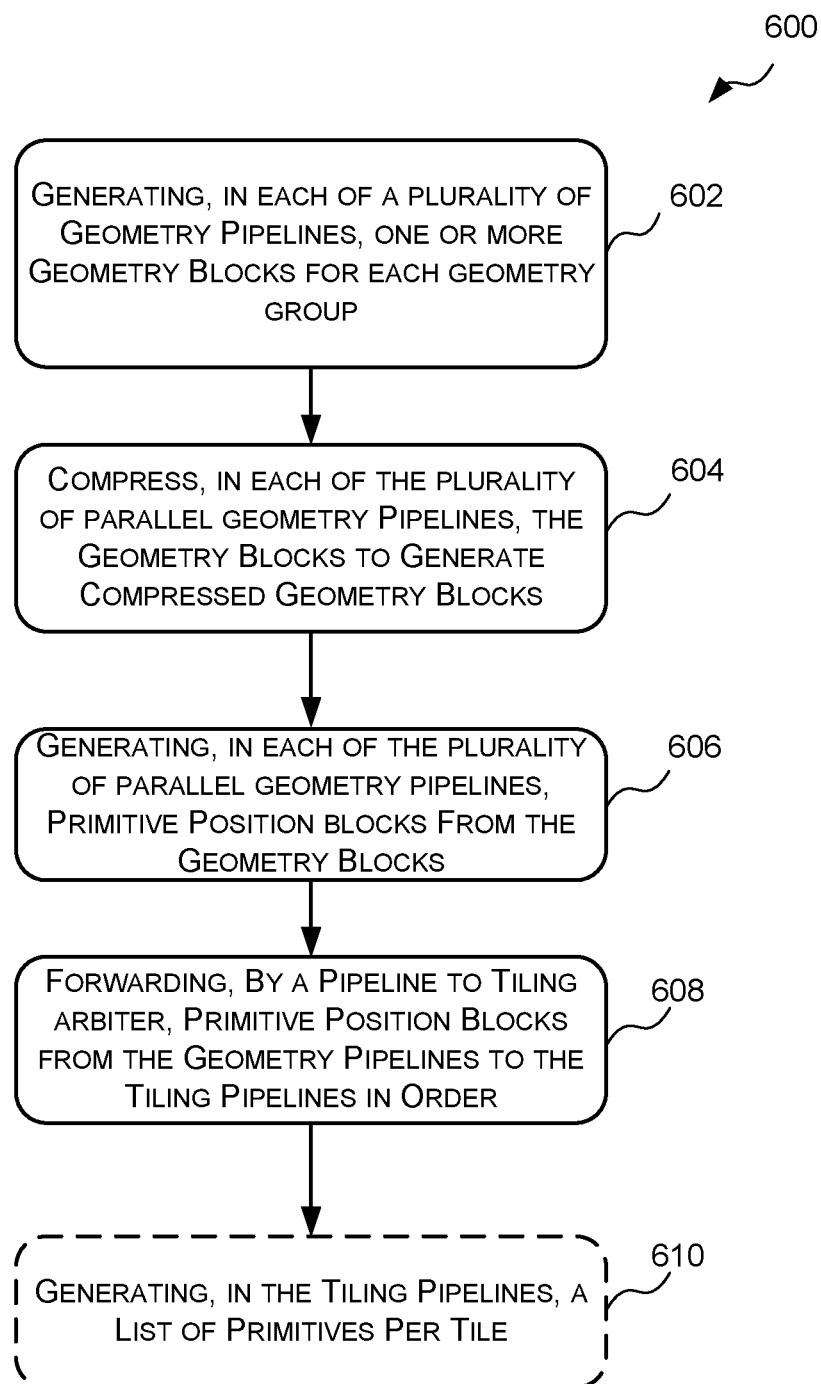
FIG. 6 is a flow chart of an example method for implementing the geometry processing phase of TBR wherein compression is performed on the geometry blocks prior to geometry pipeline to tiling pipeline arbitration.

Reference is now made to FIG. 6 which illustrates an example method 600 for performing the geometry processing phase of TBR wherein compression is performed prior to geometry-tiling pipeline arbitration.

The method 600 begins at block 602 wherein each of a plurality of parallel geometry pipelines generates one or more geometry blocks for each geometry group of a subset of the geometry groups. As described above, each geometry group (e.g. geometry group 204) comprises vertex data related to one or more vertices. In some examples, generating geometry blocks from a geometry group comprises transforming the vertices in the geometry group into screen space, assembling primitives from the transformed vertex data, performing culling to remove any redundant primitives, clipping primitives only partially within the visible volume, and bundling the transformed vertices and associated primitive information into one or more geometry blocks of an appropriate size for processing by the tiling pipelines. Each geometry block comprises transformed vertex data related to one or more vertices, and primitive data identifying the primitives formed by those vertices. Each geometry block also comprises information indicating the geometry group to which it relates. The size and number of the geometry blocks for a particular geometry group may be based on the number of vertices associated with the geometry group, a maximum number of vertices per geometry block and/or a maximum number of primitives per geometry block.

At block 604, each of the plurality of parallel geometry pipelines compresses the geometry blocks generated thereby to form corresponding compressed geometry blocks. The compressed geometry blocks may then be stored in memory for use in a subsequent process (e.g. rasterization). The compression can be performed using any known compression method or technique. The method 600 then proceeds to block 606.

At block 606, a primitive position block is generated for each geometry block. The primitive position block includes information indicating the position of each primitive in the geometry block which the tiling engine can use to determine whether the primitive falls within the bounds of a tile. Information indicating the position of a primitive may include, for example, the x and y coordinates of the vertices forming the primitive, and/or the x, y coordinates of a bounding box (e.g. defined by the max and min of the x, y coordinates of the vertices forming the primitive) around the primitive. The method 600 then proceeds to block 608.

At block 608, the geometry to tiling arbiter 510 forwards the primitive position blocks generated by the plurality of geometry pipelines to the plurality of tiling pipelines in order. In other words, all of the primitive position blocks generated by the geometry pipelines are funnelled through the GTA 510 where they are put in the correct order (e.g. based on the geometry group numbers associated therewith) and then forwarded to the tiling pipelines in that order. Although the geometry groups are typically sent to the geometry pipelines in the correct order the primitive position blocks generated thereby may not always be output in the correct order. For example, a first geometry pipeline may output the primitive position block(s) associated with geometry group 0 after a second geometry pipeline outputs the primitive position block(s) associated with geometry group 1 where geometry group 0 precedes geometry group 1 in the ordering. Since it is important that the primitive position blocks be processed by the plurality of tiling pipelines in the correct order the primitive position blocks cannot simply be provided to the tiling pipelines in the order that they are output. Accordingly, arbitration is performed between the geometry pipelines and the tiling pipelines to ensure that the primitive position blocks are provided to the tiling pipelines in the correct order.

In some cases, arbitrating between the plurality of geometry pipelines and the tiling pipelines comprises setting one of the plurality of geometry pipelines as the active geometry pipeline based on which geometry pipeline has generated a primitive position block associated with the next geometry group and then forwarding all primitive position blocks associated with that geometry group to the tiling pipelines before selecting the next active geometry pipeline. An example method for arbitrating between the plurality of geometry pipelines and the tiling pipelines will be described below with reference to FIG. 10.

At block 610, the primitive position blocks are processed in order by the plurality of tiling pipelines to generate a list (e.g. list 402 of FIG. 4) for each tile that indicates which primitives fall within the boundaries of that tile.

Figure 7:
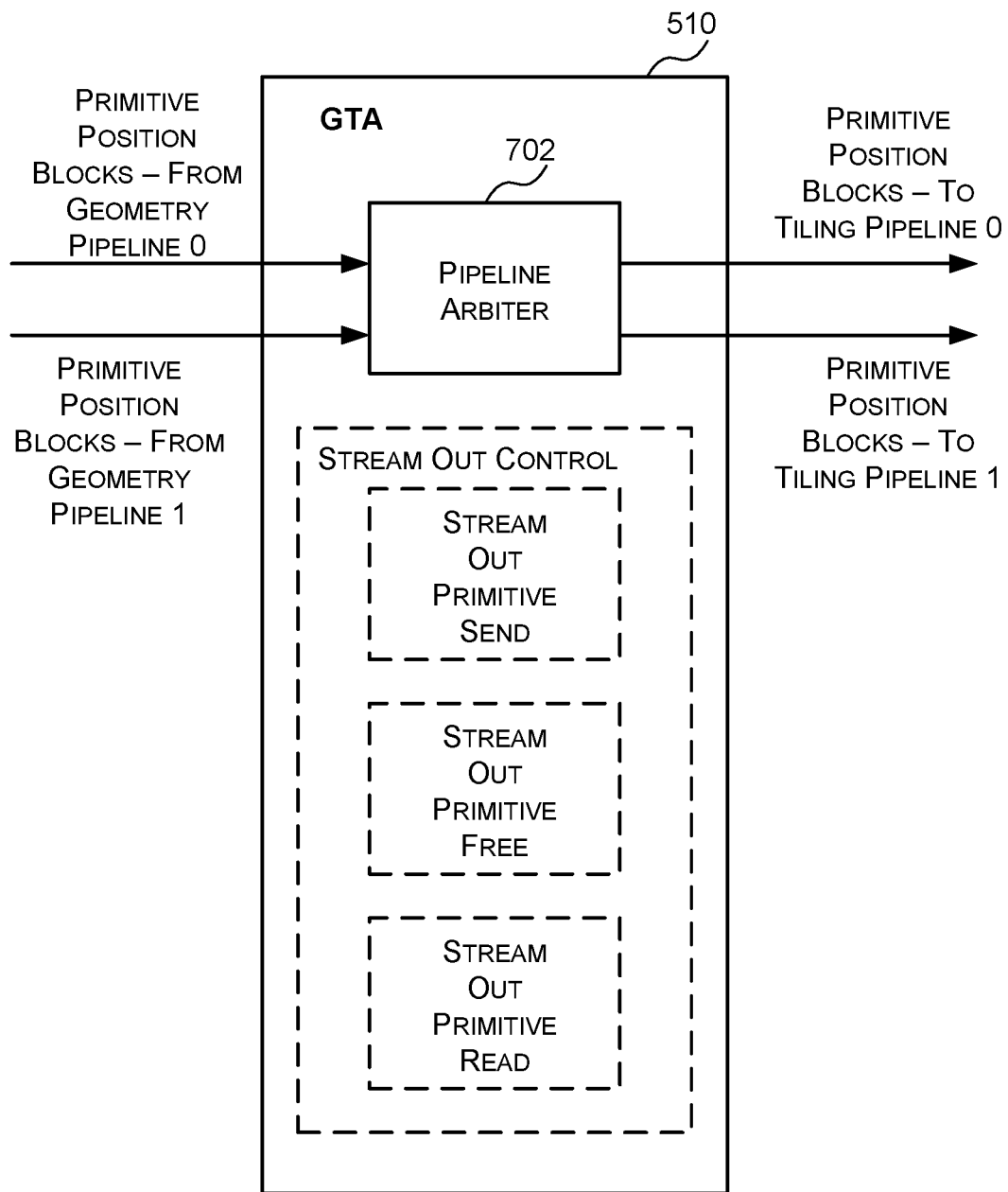
FIG. 7 is a block diagram of an example GTA of FIG. 5.

Reference is now made to FIG. 7 which illustrates an example implementation of the GTA 510 of FIG. 5. As described above, the GTA 510 is configured to arbitrate between the geometry pipelines 502, 504 and the tiling pipelines 506, 508 to ensure that the primitive position blocks generated by the geometry pipelines 502, 504 are processed by the tiling pipelines 506, 508 in the correct order.

The example GTA 510 of FIG. 5 comprises a pipeline arbiter 702 that is configured to perform arbitration between the geometry pipelines 502, 504 and the tiling pipelines 506, 508. The pipeline arbiter 702 has one input per geometry pipeline for receiving the primitive position blocks generated by a particular geometry pipeline; and one output per tiling pipeline for transmitting primitive position blocks to a particular tiling pipeline. In the example of FIG. 7 there are two geometry pipelines and thus two inputs, and two tiling pipelines and thus two outputs.

The pipeline arbiter 702 is configured to select the geometry pipeline 502, 504 that is associated with the next geometry group (based on the geometry group numbers) as the active geometry pipeline and provide all primitive position blocks associated with that geometry group to one or more of the tiling pipelines. Where the geometry group numbers are such that a geometry group that has a lower geometry group number is to be processed before a geometry group that has a higher geometry group number the pipeline arbiter 702 may be configured to select the geometry pipeline 502, 504 that is associated with the lowest geometry group number as the active geometry pipeline. Where, however, the geometry group numbers are such that a geometry group that has a higher geometry group number is to be processed before a geometry group that has a lower geometry group number the pipeline arbiter 702 may be configured to select the geometry pipeline 502, 504 that is associated with the highest geometry group number.

To ensure that the primitive position blocks are processed in the correct order the pipeline arbiter 702 may also be configured to replace the geometry group identifiers (e.g. numbers) with sequence numbers. In particular, when the primitive position blocks are received by the pipeline arbiter 702 each primitive position block will be associated with a geometry group identifier (e.g. number). Since there may be more than one primitive position block associated with the same geometry group, there may be more than one primitive position block associated with the same geometry group number, thus, without further information the ordering of the primitive position blocks associated with the same geometry group may not be maintained. Accordingly, the pipeline arbiter 702 replaces the geometry group identifiers (e.g. numbers) with individual sequence numbers.

For example, as shown in FIG. 2 if geometry group 0 produces geometry blocks 0 and 1 (resulting in primitive position blocks 0 and 1), and geometry group 1 also produces geometry blocks 0 and 1 (resulting in primitive position blocks 0 and 1), then primitive position blocks 0 of geometry group 0 may be assigned sequence number 0; primitive position block 1 of geometry group 0 may be assigned sequence number 1; primitive position block 0 of geometry group 1 may be assigned sequence number 2; and primitive position block 1 of geometry group 1 may be assigned sequence number 3 and so on. Another example of generating sequence numbers will be provided below in reference to FIG. 9.

Once all the primitive position blocks associated with the current geometry group have been provided to the tiling pipelines (with the appropriate sequence numbers) the pipeline arbiter 702 repeats the process—i.e. the pipeline arbiter 702 selects the geometry pipeline 502, 504 that is associated with the next geometry group as the active geometry pipeline and provides all primitive position blocks associated with that geometry group to one or more of the tiling pipelines etc.

An example implementation of the pipeline arbiter 702 is described below with reference to FIG. 8.

Figure 8:
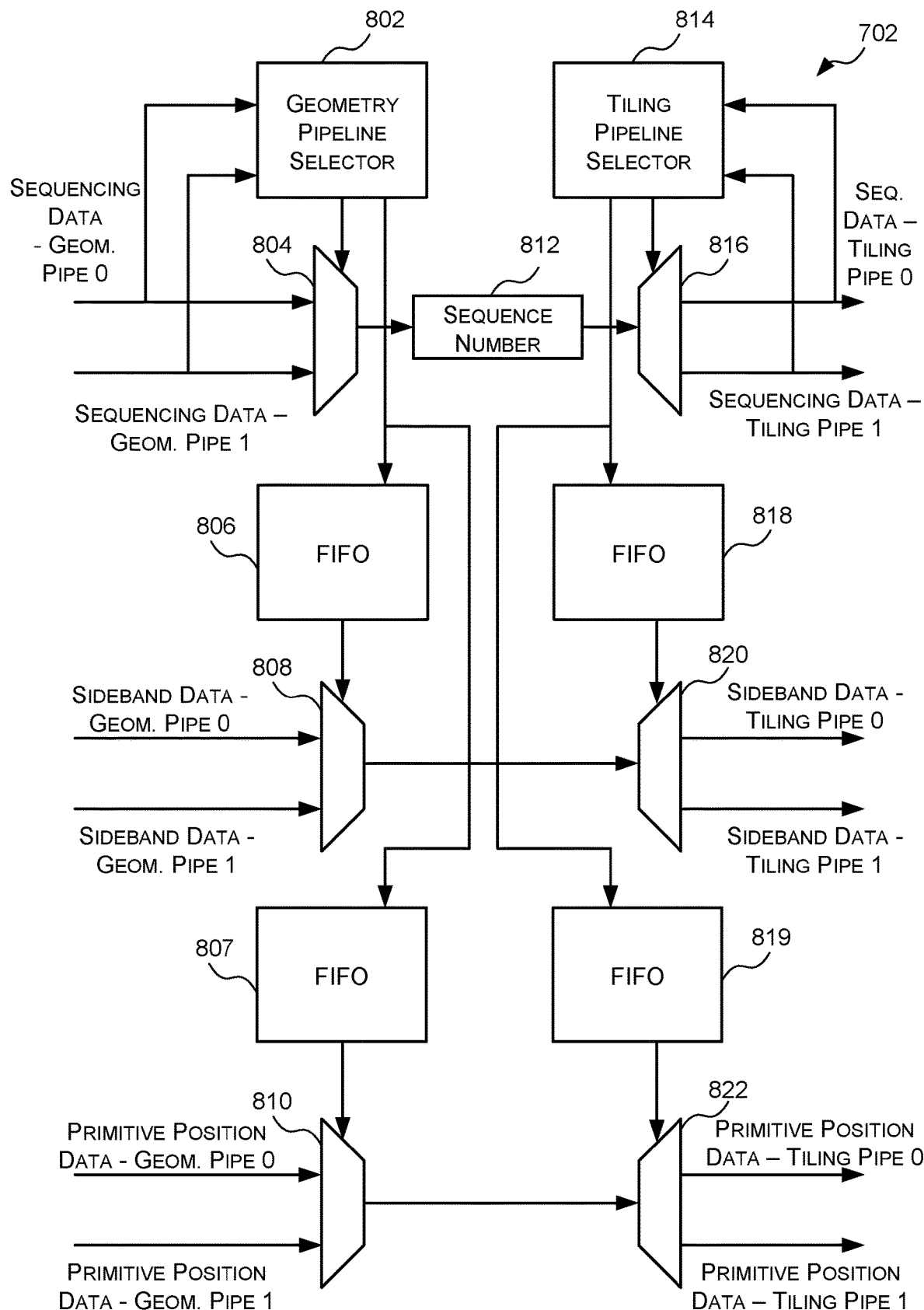
FIG. 8 is a block diagram of an example pipeline arbiter of FIG. 7.

In some cases, the GTA 510 may also be configured to act as an interface between components of the geometry pipelines Reference is now made to FIG. 8 which illustrates an example implementation of the pipeline arbiter 702 of FIG. 7. As described above, the pipeline arbiter 702 is configured to select the geometry pipeline 502, 504 that is associated with the next geometry group (based on the geometry group numbers) as the active geometry pipeline and to forward all primitive position blocks associated with that geometry group to one or more of the tiling pipelines. In the example of FIG. 8 each primitive position block can be understood as comprising three sets of data—sequencing data, sideband data and primitive position data (PPD)—and each set is streamed into the pipeline arbiter 702 separately.

The primitive position data (PPD) comprises information identifying the position of one or more primitives to be tiled. The primitive position data may comprise the x and y coordinates of the vertices of the primitives from the corresponding geometry block; and/or the primitive position data may comprise information defining a bounding box for each primitive (defined by the max and min of the x and y coordinates of the vertices of the primitive). The primitive position data may also include other information that may aid a tiling engine in determining whether the primitives fall within the boundary of a tile. For example, where the primitive is a point, a line or a polygon (e.g. triangle) made up of points/lines (rather than being a solid triangle) the primitive position data may also include widths of the points or lines. Where the primitives are polygons (e.g. triangles) the primitive position data may also include a winding order indicating the order in which the vertices are sent (e.g. clockwise or counter-clockwise). The primitive position data may also include information indicating, for each primitive, whether the primitive is so small that it is only 1 tile wide in either direction.

The sideband data comprises state and other information related to the primitive position block and/or primitives within the primitive position block. The sideband data may comprise, for example, information about the corresponding geometry block, such as, but not limited to the address in memory where the corresponding compressed geometry block has been stored, the location of the data relating to a particular primitive within the compressed geometry block, the size of the ISP state, and the render target, memory page open/close requests, and a terminate word to end the current render. The sequencing data comprises information that allows the primitive position blocks to be processed in the correct order. The sequencing data may comprise, for example, information that indicates the start of a geometry group, the end of a geometry group, the start of a primitive position block, the end of a primitive position block, and the geometry group number.

In the pipeline arbiter 702 of FIG. 8 the sequencing data is used as the master data to control the selection of the active geometry pipeline. Specifically, the example pipeline arbiter 702 of FIG. 8 comprises a geometry pipeline selector 802 which is configured to monitor the sequencing data from the plurality of geometry pipelines (in the example of FIG. 8 there are two geometry pipelines—geometry pipeline 0 and geometry pipeline 1) to detect the end of the current geometry group. In response to detecting the end of the current geometry group the geometry pipeline selector 802 determines which of the geometry pipelines is to be the next active geometry pipeline based on the geometry group numbers detected in the sequence data for the plurality of geometry pipelines. In particular, the geometry group selector identifies from the sequencing data which of the geometry pipelines is associated with the next geometry group (e.g. which geometry pipeline is associated with the lowest geometry group number, or which geometry is associated with the highest geometry group number).

Once the geometry pipeline selector 802 has selected one of the plurality of geometry pipelines as the active geometry pipeline, the geometry pipeline selector 802 sends a signal (e.g. the selected geometry pipeline number) to a sequencing multiplexer (MUX) 804 which causes the sequencing MUX 804 to output the sequencing data of the selected or active geometry pipeline. The geometry pipeline selector also sends a signal (e.g. the selected geometry pipeline number) to (i) a first FIFO (first in first out) 806 which will cause a sideband MUX 808 to output the sideband data of the selected or active geometry pipeline; and (ii) a second FIFO 807 which will cause a primitive MUX 810 to output the primitive position data of the selected or active geometry pipeline in response to detecting the start of a new primitive position block. The sideband data interface is then configured to pop the signal (e.g. selected geometry pipeline number) off the first FIFO 806 which causes the sideband MUX 808 to output the sideband data of the selected or active geometry pipeline; and the primitive data interface is configured to pop the signal (e.g. selected geometry pipeline number) off the second FIFO 807 which causes the primitive MUX 810 to output the primitive position data of the selected or active geometry pipeline in response to detecting the start of a new primitive position block.

The pipeline arbiter 702 also includes a sequence number generator 812 for transforming the geometry group numbers into sequence numbers. The sequence number generator 812 receives the sequencing data of the selected or active geometry pipeline and monitors the sequencing data to detect the start of a new primitive position block. In response to detecting a new primitive position block, the sequence number generator 812 generates a new sequence number and replaces the geometry group number in the sequencing data with the sequence number. In some examples, the sequence number generator 812 includes an N-bit counter that holds the current sequence number and the counter is incremented each time a new primitive position block is detected by the sequence number generator 812. An example of how the sequence numbers may be generated by the sequence number generator 812 is described below with reference to FIG. 9.

The pipeline arbiter 702 of FIG. 8 also include a tiling pipeline selector 814 that is configured to select one of the plurality of tiling pipelines as the recipient of the sequencing, sideband and primitive data of the selected geometry pipeline and cause the sequencing data, sideband data, and primitive position data of the selected or active geometry pipeline to be forwarded to the selected tiling pipeline. In the example of FIG. 8 the tiling pipeline selector 814 monitors the sequencing data output to the tiling pipelines to determine the correct tiling pipeline. Once the tiling pipeline selector 814 has selected which tiling pipeline will receive the data from the active geometry group the tiling pipeline selector 814 sends a signal (e.g. the selected tiling pipeline number) to a sequencing demultiplexer 816 which causes the sequencing demultiplexer 816 to forward the sequencing data of the selected or active geometry pipeline to the selected tiling pipeline. The tiling pipeline selector 814 also sends a signal (e.g. the selected tiling pipeline number) to (i) a third FIFO (first in first out) 818 which will cause a sideband demultiplexer 820 to forward the sideband data of the selected or active geometry pipeline to the selected tiling pipeline; and (ii) a fourth FIFO 819 which will cause a primitive demultiplexer 822 to forward the primitive position data of the selected or active geometry pipeline to the selected tiling pipeline when the tiling pipeline selector 814 detects a new primitive position block. The sideband data interface is then configured to pop the signal off the third FIFO 818 which causes the sideband demultiplexer 820 to forward the sideband data of the selected or active geometry pipeline to the selected tiling pipeline; and the primitive data interface is configured to pop the signal off the fourth FIFO 819 which will cause the primitive demultiplexer 822 to forward the primitive position data of the selected or active geometry pipeline to the selected tiling pipeline when the tiling pipeline selector 814 detects a new primitive position block.

This configuration allows the three streams to be processed independently without repeating the switching logic (e.g. the geometry pipeline selector 802 and tiling pipeline selector 814) Since the streams can run at different speeds, allowing each of the data streams (sequencing data, sideband data and primitive position data) to be processed independently may improve the performance of the pipeline arbiter.

Figure 9:
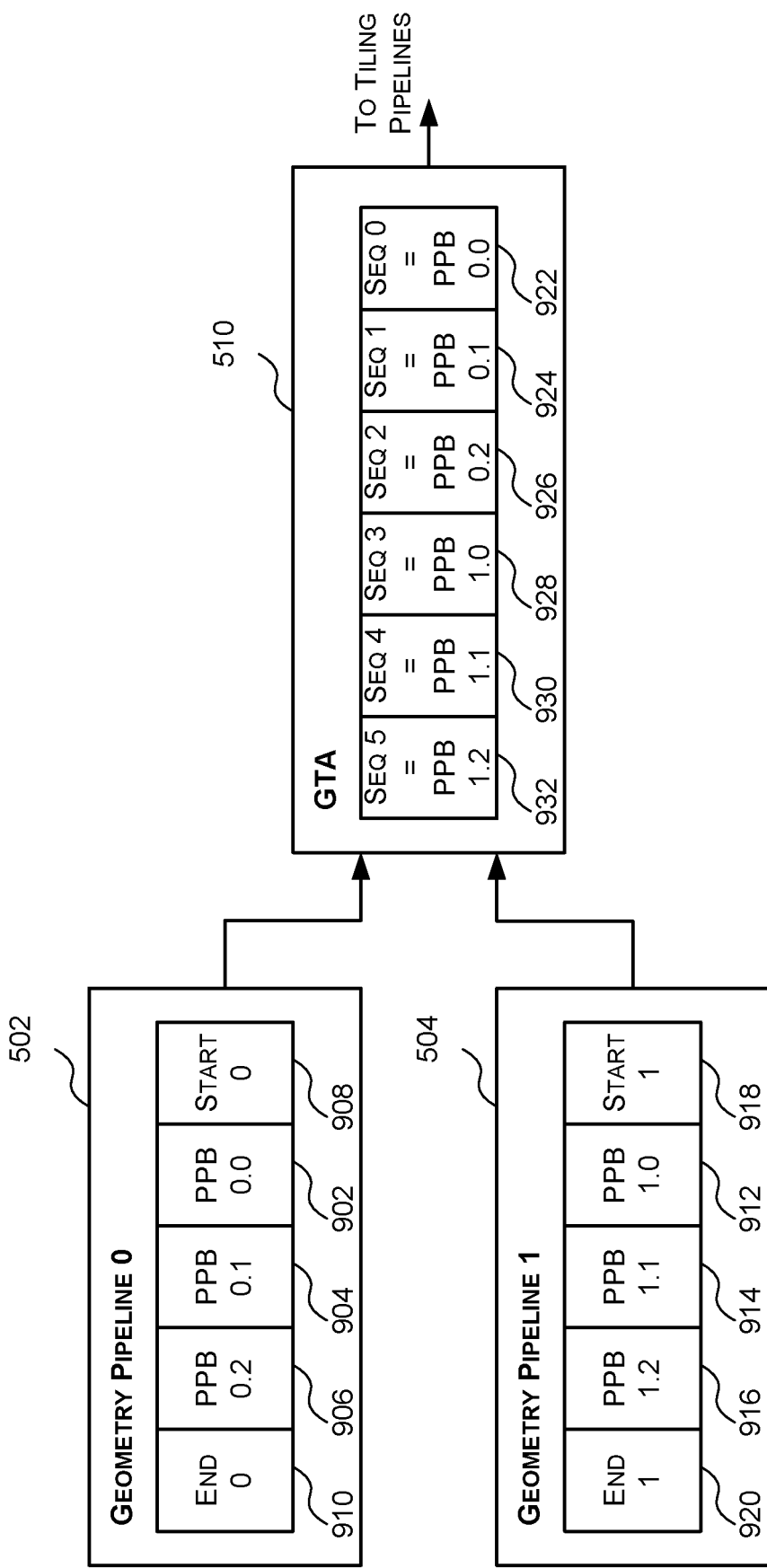
FIG. 9 is a schematic diagram illustrating the allocation of sequence numbers by the GTA of FIG. 5.

Reference is now made to FIG. 9 which illustrates the operation of the GTA 510 and particularly the allocation of sequence numbers to primitive position blocks. In the example of FIG. 9 there are two geometry pipelines 502, 504—geometry pipeline 0 and geometry pipeline 1. Geometry pipeline 0 generates three primitive position blocks (PPB) 902, 904, 906 for geometry group 0 which are preceded by start geometry group 0 information 908 and followed by end geometry group 0 information 910. Geometry pipeline 1 generates three primitive position blocks (PPB) 912, 914 and 916 from geometry group 1 which are preceded by start geometry group 1 information 918 and followed by end geometry group 1 information 920. The GTA 510 will determine that geometry pipeline 0 is the geometry pipeline associated with the next geometry group (geometry group 0) and then will forward three primitive position blocks 922, 924, 926 corresponding to the primitive position blocks 902, 904 and 906 of geometry group 0 to the appropriate tiling pipeline with sequence numbers 0, 1 and 2 appended thereto respectively. Once the GTA 510 receives the end geometry group 0 information the GTA 510 will determine that geometry pipeline 1 is the geometry pipeline associated with the next geometry group (geometry group 1) and then will forward three primitive position blocks 928, 930 and 932 corresponding to the primitive position blocks 912, 914, 916 to the appropriate tiling pipeline with sequence numbers 3, 4 and 5 appended thereto respectively.

Figure 10:
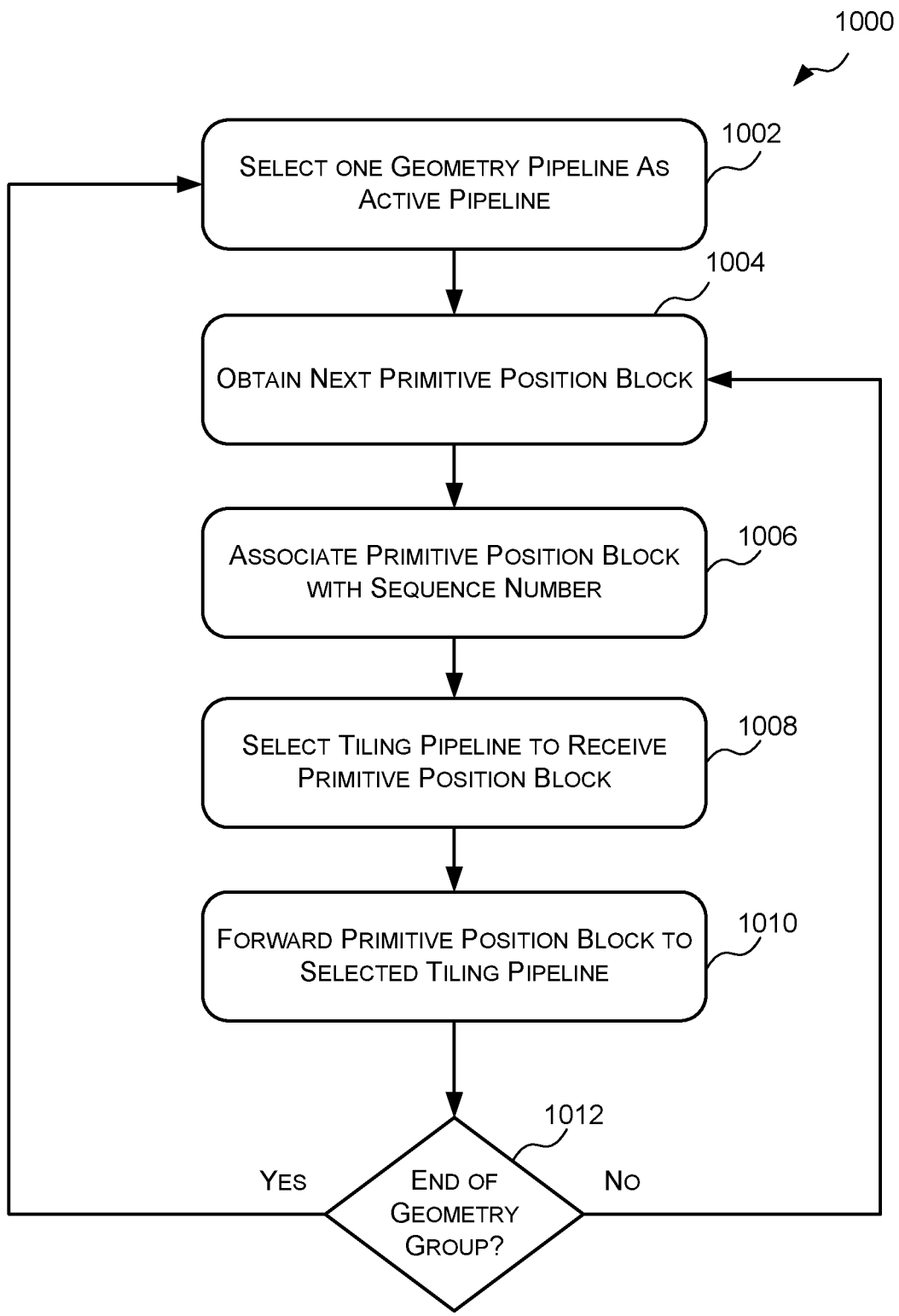
FIG. 10 is a flow chart of an example method for arbitrating between a plurality of geometry pipelines and a plurality of tiling pipelines.

Reference is now made to FIG. 10 which illustrates an example method 1000 for arbitrating between a plurality of geometry pipelines and a plurality of tiling pipelines which may be implemented by the GTA 510 of FIG. 5 and/or the pipeline arbiter 702 of FIGS. 7 and 8. In the method 1000 the GTA identifies the geometry pipeline that is associated with the next geometry group and locks on to that geometry pipeline for the duration of that geometry group. In particular, the GTA forwards all of the primitive position blocks associated with that geometry group to the tiling pipelines. Only after all the primitive position blocks associated with that geometry group have been forwarded to the tiling pipelines does the GTA unlock from that geometry pipeline and identify the next geometry pipeline to lock onto.

The method 1000 begins at block 1002 wherein the GTA 510 (e.g. pipeline arbiter 702) selects one of the plurality of geometry pipelines as the active geometry pipeline. The GTA 510 selects, based on the geometry group numbers, the geometry pipeline associated with the next geometry group as the active geometry pipeline. As described above, for example, where a geometry group with a lower geometry group number is to precede a geometry group with a higher geometry group number the GTA 510 may select the geometry pipeline associated with the lowest geometry group number; or where a geometry group with a higher geometry group number is to precede a geometry group with a lower geometry group number the GTA 510 may select the pipeline associated with the highest geometry group number. Once one of the geometry pipelines has been selected as the active geometry pipeline the GTA 510 is said to be locked on to that pipeline and the method proceeds to block 1004.

At block 1004, the GTA 510 obtains the next primitive position block from the selected or active geometry pipeline. Once the next primitive position block has been obtained the method 1000 proceeds to block 1006.

At block 1006, the GTA 510 converts, or translates, the geometry group number associated with the primitive position block obtained in block 1004 to a sequence number to generate a modified primitive position block. Since the geometry pipelines operate on a per geometry group basis and the tiling pipelines operate on a per primitive position block basis assigning an individual sequence number to each primitive position block allows the ultimate order of the primitive position blocks to be maintained throughout the tiling pipelines. As described above with reference to FIGS. 7 and 8, the GTA 510 may maintain a rolling n-bit counter and each time a new primitive position block is obtained the current counter value is used as the sequence number of that primitive position block and the counter is incremented to generate the sequence number for the next primitive position block. Once the geometry group number of the primitive position block is converted into a sequence number the method 1000 proceeds to block 1008.

At block 1008, the GTA 510 selects one of the plurality of tiling pipelines to receive the modified primitive position block. In some cases, there may be one tiling pipeline dedicated to each geometry pipeline which can only process primitive position blocks from that geometry pipeline. In other words, there is a one-to-one relationship between geometry pipelines and tiling pipelines. In these cases, the GTA 510 selects the tiling pipeline corresponding to the selected or active geometry pipeline as the tiling pipeline to receive the modified primitive position block. In other cases, each pipeline may be able to receive primitive position blocks from any geometry pipeline. In these cases, the GTA 510 may select the tiling pipeline to receive the primitive position block based on any suitable criteria or metric. For example, in some cases the GTA 510 may select the tiling pipelines in a round robin manner. Once the GTA 510 has selected one of the plurality of tiling pipelines to receive the modified primitive position block, the method 1000 proceeds to block 1010.

At block 1010, the GTA 510 forwards the modified primitive position block to the tiling pipeline selected in block 1008. Once the GTA 510 has forwarded the modified primitive position block to the selected tiling pipeline then the method 1000 proceeds to block 1012.

At block 1012, the GTA 510 determines whether the primitive position block obtained at block 1004 was the last primitive position block of the geometry group. In other words, the GTA 510 determines if the GTA 510 has forwarded all primitive position blocks associated with the current geometry group to the tiling pipelines. In some cases, the geometry pipelines may be configured to provide the primitive position blocks to the GTA 510 as a geometry group. For example, as shown in FIG. 9 the primitive position blocks associated with the same geometry group may be preceded by start geometry group information and followed by end geometry group information. In these cases, the GTA 510 may determine that the end of the geometry group has been reached (and thus all primitive position blocks associated with the geometry group have been forwarded to the tiling pipelines) when the GTA 510 detects end geometry group information. If the GTA 510 determines that the end of the geometry group has been reached and all primitive position blocks associated with geometry group have been forwarded to the tiling pipelines then the GTA 510 unlocks from the current geometry pipeline and the method 1000 proceeds back to block 1002 where the GTA 510 selects one of the geometry pipelines as the active geometry pipeline. If, however, the GTA 510 determines that the end of the geometry group has not been reached and there is at least one more primitive position block associated with the geometry group that has not yet been forwarded to the tiling pipelines then the method 1000 proceeds back to block 1004 where the next primitive position block of the geometry group is obtained.

Figure 11:
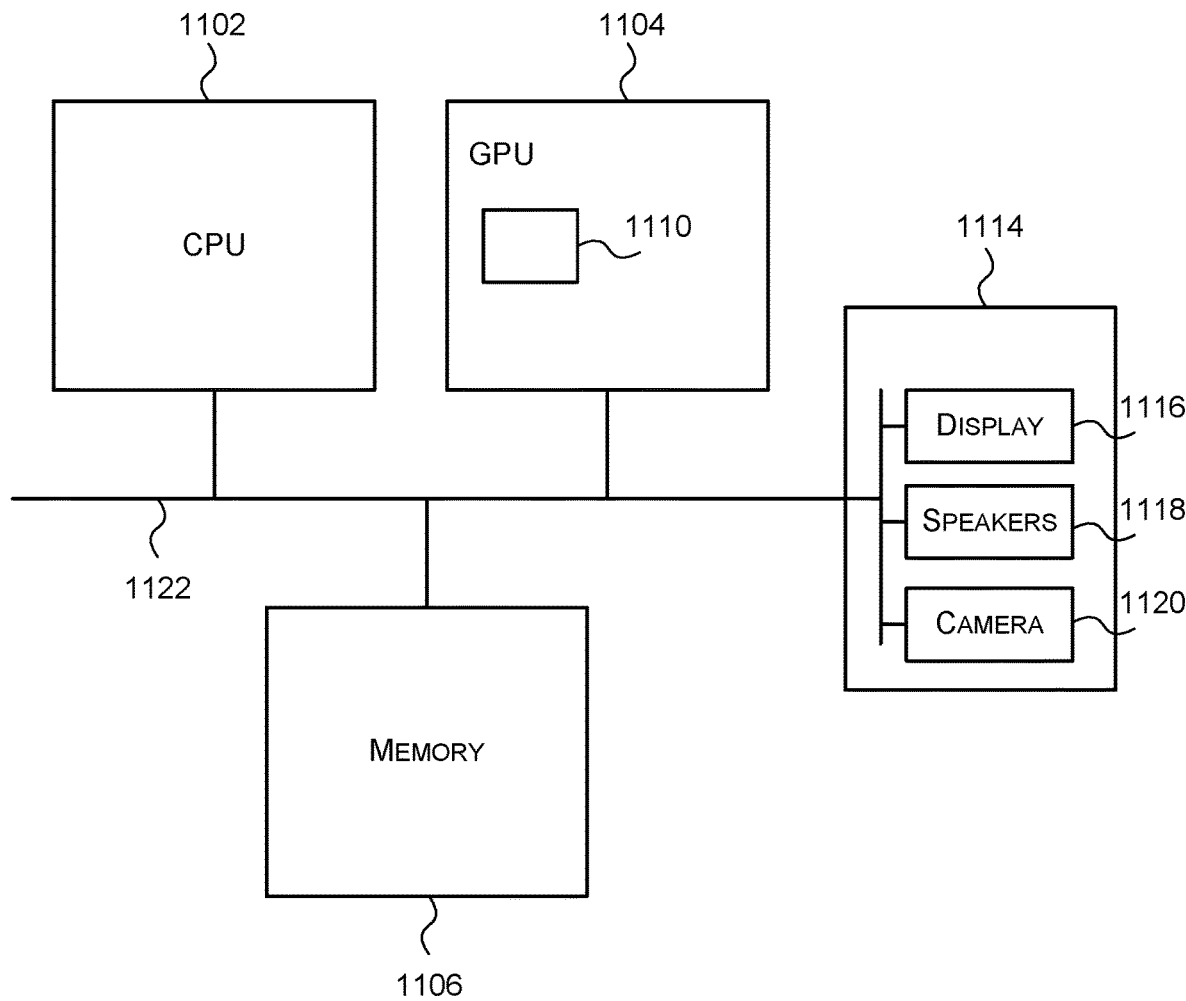
FIG. 11 is a block diagram of an example computer system in which the system to implement the geometry processing phase of TBR described herein is implemented.

FIG. 11 shows a computer system in which the system 500 described herein may be implemented. The computer system comprises a CPU 1102, a GPU 1104, a memory 1106 and other devices 1114, such as a display 1116, speakers 1118 and a camera 1120. A system 1110 (corresponding to the system 500 of FIG. 5) is shown implemented within the GPU 1104. In other examples, the system 1110 may be implemented within the CPU 1102. The components of the computer system can communicate with each other via a communications bus 1122.

The systems, GTAs and pipeline arbiters of FIGS. 1, 5, 8 and 9 are shown as comprising a number of functional blocks. This is schematic only and is not intended to define a strict division between different logic elements of such entities. Each functional block may be provided in any suitable manner. It is to be understood that intermediate values described herein as being formed by an element of the system 500 need not be physically generated by the system 500 at any point and may merely represent logical values which conveniently describe the processing performed by the system 500 between its input and output.

The systems, GTAs and pipeline arbiters described herein may be embodied in hardware on an integrated circuit. The systems, GTAs and pipeline arbiters described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a system configured to perform any of the methods described herein, or to manufacture a processor comprising any apparatus described herein. An integrated circuit definition dataset may be, for example, an integrated circuit description.

There may be provided a method of manufacturing, at an integrated circuit manufacturing system, a system as described herein. There may be provided an integrated circuit definition dataset that, when processed in an integrated circuit manufacturing system, causes the method of manufacturing a system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a system (e.g. system 500) will now be described with respect to FIG. 12.

Figure 12:
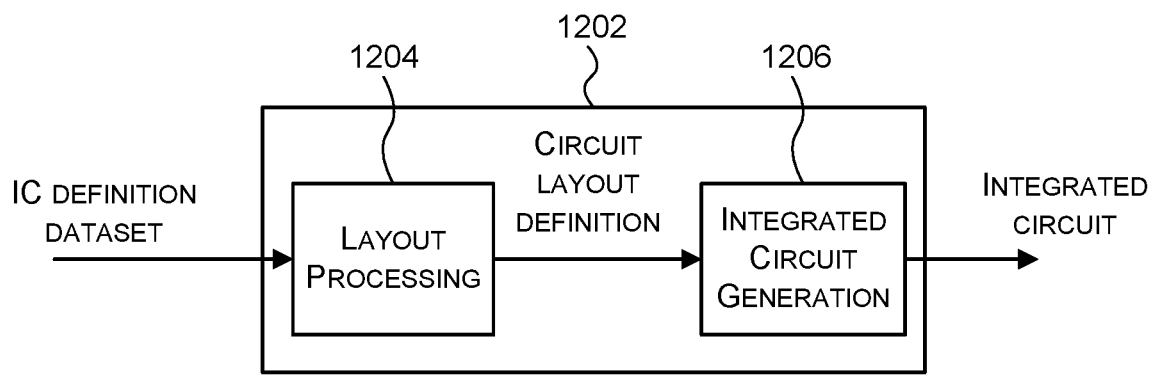
FIG. 12 is a block diagram of an example integrated circuit manufacturing system for generating an integrated circuit embodying a system to implement the geometry processing phase of TBR as described herein.

FIG. 12 shows an example of an integrated circuit (IC) manufacturing system 1202 which is configured to manufacture a system (e.g. system 500) as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a system (e.g. system 500) as described in any of the examples herein), process the IC definition dataset, and generate an IC according to the IC definition dataset (e.g. which embodies a system (e.g. system 500) as described in any of the examples herein). The processing of the IC definition dataset configures the IC manufacturing system 1202 to manufacture an integrated circuit embodying a system (e.g. system 500) as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a system (e.g. system 500) without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing systems described herein may be embodied in hardware on an integrated circuit. The graphics processing systems described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An arbiter for arbitrating between a plurality of geometry pipelines and a plurality of tiling pipelines in a graphics processing unit, the arbiter comprising:
   a geometry pipeline selector configured to:
   (a) receive, from each geometry pipeline of the plurality of geometry pipelines, sequencing data for a next primitive position block generated by that geometry pipeline that identifies a geometry group associated with that primitive position block;
   (b) select, based on the sequencing data, a geometry pipeline of the plurality of geometry pipelines with a primitive position block associated with a next geometry group as an active geometry pipeline; and
   (c) cause primitive position data for the next primitive position block of the active geometry pipeline to be forwarded to one of the plurality of tiling pipelines.

2. The arbiter of claim 1, wherein the geometry pipeline selector is further configured to:
   (d) receive, from the active geometry pipeline, sequencing data for a following primitive position block generated by that geometry pipeline that identifies a geometry group associated with that primitive position block; and
   (e) in response to determining that the following primitive position block for the active geometry pipeline is associated with a same geometry group as the next primitive position block for the active geometry pipeline, repeat (c) for the following primitive position block.

3. The arbiter of claim 2, wherein the geometry pipeline selector is further configured to, in response to determining that the following primitive position block for the active geometry pipeline is not associated with the same geometry group as the next primitive position block for the active geometry pipeline, repeat (b) and (c).

4. The arbiter of claim 1, further comprising a sequence number generator configured to receive the sequencing data for the next primitive position block of the active geometry pipeline, generate a sequence number for that primitive position block, and output a version of the sequencing data that comprises the generated sequence number.

5. The arbiter of claim 4, wherein the sequence number generator comprises an N-bit counter that is configured to hold a current sequence number, and the sequence number generator is configured to include the current sequence number in the sequencing data and then increment the N-bit counter.

6. The arbiter of claim 1, further comprising a sequencing multiplexer configured to receive the sequencing data for the next primitive position block for each geometry pipeline of the plurality of geometry pipelines; and wherein the geometry pipeline selector is further configured to cause the sequencing multiplexer to output the sequencing data for the next primitive position block for the active geometry pipeline for use in generating sequencing data for the primitive position block forwarded to the one of the plurality of tiling pipelines.

7. The arbiter of claim 1, further comprising a primitive multiplexer configured to receive primitive position data for the next primitive position block for each geometry pipeline of the plurality of geometry pipelines; and wherein the geometry pipeline selector is further configured to cause the primitive multiplexer to output the primitive position data for the next primitive position block for the active geometry pipeline for forwarding to the one of the plurality of tiling pipelines.

8. The arbiter of claim 7, wherein the geometry pipeline selector is configured to cause the primitive position data for the next primitive position block of the active geometry pipeline to be output to the one of the plurality of tiling pipelines by outputting a signal indicating the active geometry pipeline, and the arbiter further comprises a buffer that is configured to receive the signal indicating the active geometry pipeline and output the signal in a first in first out order to the primitive multiplexer.

9. The arbiter of claim 1, further comprising a sideband multiplexer configured to receive sideband data for the next primitive position block for each geometry pipeline of the plurality of geometry pipelines; and wherein the geometry pipeline selector is configured to cause the sideband multiplexer to output the sideband data for the next primitive position block of the active geometry pipeline for forwarding to the one of the plurality of tiling pipelines.

10. The arbiter of claim 9, wherein the geometry pipeline selector is configured to cause the primitive position data for the next primitive position block of the active geometry pipeline to be output to the one of the plurality of tiling pipelines by outputting a signal indicating the active geometry pipeline, and the arbiter further comprises a buffer that is configured to receive the signal indicating the active geometry pipeline and output the signal in a first in first out order to the sideband multiplexer.

11. The arbiter of claim 1, further comprising a tiling pipeline selector configured to: select, based on the sequencing data, a tiling pipeline of the plurality of pipelines to receive the primitive position data for the next primitive position block of the active geometry pipeline; and cause the primitive position data for the next primitive position block of the active geometry pipeline to be forwarded to the selected tiling pipeline.

12. The arbiter of claim 11, further comprising a sequencing demultiplexer configured to receive the sequencing data for the next primitive position block of the active geometry pipeline; and wherein the tiling pipeline selector is configured to cause the sequencing demultiplexer to output the sequencing data for the next primitive position block of the active geometry pipeline to the selected tiling pipeline.

13. The arbiter of claim 11, further comprising a primitive demultiplexer configured to receive the primitive position data for the next primitive position block for the active geometry pipeline; and wherein the tiling pipeline selector is further configured to cause the primitive demultiplexer to output the primitive position data for the next primitive position block for the active geometry pipeline to the selected tiling pipeline.

14. The arbiter of claim 13, wherein the tiling pipeline selector is configured to cause the primitive position data for the next primitive position block of the active geometry pipeline to be output to the selected pipeline by outputting a signal indicating the selected tiling pipeline, and the arbiter further comprises a buffer that is configured to receive the signal indicating the selected tiling pipeline and output the received signal in a first in first out order to the primitive demultiplexer.

15. The arbiter of claim 11, further comprising a sideband demultiplexer configured to receive sideband data for the next primitive position block for the active geometry pipeline; and wherein the tiling pipeline selector is configured to cause the sideband demultiplexer to output the sideband data for the next primitive position block of the active geometry pipeline to the selected tiling pipeline.

16. The arbiter of claim 15, wherein the tiling pipeline selector is configured to cause the primitive position data for the next primitive position block of the active geometry pipeline to be output to the selected tiling pipeline by outputting a signal indicating the selected tiling pipeline; and the arbiter further comprises a buffer that is configured to receive the signal indicating the selected tiling pipeline and output the signal in a first in first out order to the sideband demultiplexer.

17. The arbiter of claim 1, wherein each geometry group is associated with a geometry group number that indicates an order of that geometry group relative to the other geometry groups and the next geometry group is the geometry group associated with a lowest or highest geometry group number.

18. A graphics processing unit comprising the arbiter as set forth in claim 1.

19. A non-transitory computer readable storage medium having stored thereon a computer readable dataset description of an integrated circuit that, when processed in an integrated circuit manufacturing system, causes the integrated circuit manufacturing system to manufacture the arbiter as set forth in claim 1.

20. A method of arbitrating between a plurality of geometry pipelines and a plurality of tiling pipelines in a graphics processing unit, the method comprising:
  receiving, from each geometry pipeline of the plurality of geometry pipelines, sequencing data for a next primitive position block generated by that geometry pipeline that identifies a geometry group associated with that primitive position block;
  selecting, based on the sequencing data, a geometry pipeline of the plurality of geometry pipelines with a primitive position block associated with a next geometry group as an active geometry pipeline; and
  causing primitive position data for the next primitive position block of the active geometry pipeline to be forwarded to one of the plurality of tiling pipelines.

* * * * *